US012772008B2

(12) United States Patent
Ye et al.

(10) Patent No.: US 12,772,008 B2
(45) Date of Patent: Oct. 20, 2026

(54) APPARATUS

(71) Applicant: LG Display Co., Ltd., Seoul (KR)

(72) Inventors: Jaehun Ye, Tokyo (JP); Shinji Takasugi, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 861 days.

(21) Appl. No.: 18/087,561

(22) Filed: Dec. 22, 2022

(65) Prior Publication Data

US 2023/0209276 A1 Jun. 29, 2023

(30) Foreign Application Priority Data

Dec. 28, 2021 (JP) ................................. 2021-214047

(51) Int. Cl.

*H04R 17/00* (2006.01)
*H04R 1/28* (2006.01)
*H04R 7/04* (2006.01)
*H04R 7/06* (2006.01)

(52) U.S. Cl.

CPC ........... *H04R 17/00* (2013.01); *H04R 1/2834* (2013.01); *H04R 7/04* (2013.01); *H04R 7/045* (2013.01); *H04R 7/06* (2013.01); *H04R 2440/05* (2013.01); *H04R 2499/11* (2013.01); *H04R 2499/15* (2013.01)

(58) Field of Classification Search

CPC .......... H04R 1/2834; H04R 7/04; H04R 7/06; H04R 7/045; H04R 17/00; H04R 17/06; H04R 2440/05; H04R 2499/11; H04R 2499/15; G06F 1/1605; G06F 1/1688; G06F 2200/1612

See application file for complete search history.

(56) References Cited

U.S. PATENT DOCUMENTS

2004/0246109 A1 12/2004 Suzuki et al.
2012/0057728 A1 3/2012 Fujise et al.
2021/0392439 A1 12/2021 Ye
2023/0209268 A1* 6/2023 Ye ........................... G06F 3/016 381/333
2024/0215454 A1* 6/2024 Hwang .................. H04R 17/00

FOREIGN PATENT DOCUMENTS

CN 101330769 A 12/2008
CN 102405652 A 4/2012
CN 112822575 A 5/2021
JP 7-213997 A 8/1995
JP 2013-243609 A 12/2013
JP 2020-167360 A 10/2020
JP 2021-90141 A 6/2021
KR 10-1323323 B1 10/2013

(Continued)

*Primary Examiner* — Huyen D Le

(74) *Attorney, Agent, or Firm* — Birch, Stewart, Kolasch & Birch, LLP

(57) ABSTRACT

An apparatus can include a passive vibration member; a vibration device coupled to a rear surface of the passive vibration member; and a supporting member at the rear surface of the passive vibration member. The apparatus can include a first vibration portion; a second vibration portion coupled to a periphery of the first vibration portion; and a connection portion disposed between a periphery of the second vibration portion and the rear surface of the passive vibration member.

32 Claims, 8 Drawing Sheets

(56) References Cited

FOREIGN PATENT DOCUMENTS

| | | | |
|---|---|---|---|
| KR | 10-2018-0077582 | A | 7/2018 |
| KR | 10-2019-0054553 | A | 5/2019 |
| KR | 10-2288653 | B1 | 8/2021 |
| KR | 10-2310176 | B1 | 10/2021 |
| KR | 10-2320360 | B1 | 11/2021 |
| KR | 10-2370837 | B1 | 3/2022 |
| KR | 10-2422755 | B1 | 7/2022 |
| WO | WO 2011/105046 | A1 | 9/2011 |
| WO | WO 2018/123310 | A1 | 7/2018 |
| WO | WO 2023/084623 | A1 | 5/2023 |

* cited by examiner

APPARATUS

CROSS-REFERENCE TO RELATED APPLICATIONS

This application claims the benefit of and priority to Japanese Patent Application No. 2021-214047 filed on Dec. 28, 2021, the entirety of which is hereby incorporated by reference into the present application.

BACKGROUND

Field of the Invention

The present disclosure relates to a vibration device or vibration apparatus, and more particularly, to a vibration device for outputting a sound.

Discussion of the Related Art

An apparatus includes a separate speaker or a sound apparatus for providing a sound. The sound apparatus includes a vibration system which converts an input electrical signal into a physical vibration. Piezoelectric speakers including ferroelectric ceramic or the like are lightweight and have low power consumption, and thus, are used for various purposes.

Piezoelectric devices used for piezoelectric speakers are limited in vibration width (or displacement width), and due to this, there is a problem where it is difficult to enhance a sound characteristic and a sound pressure level characteristic of various-pitched sound bands (e.g., a middle-low-pitched sound band or a middle-high-pitched sound band). For example, piezoelectric devices for providing sound are often small, thin and fragile, and may have poor dynamic range when it comes to producing sounds of different frequencies, particularly with regards to lower frequencies.

SUMMARY OF THE DISCLOSURE

Accordingly, the present disclosure is directed to providing an apparatus that substantially obviates one or more problems due to limitations and disadvantages of the related art.

The inventor of the present disclosure have recognized the technical problem described above and have performed various experiments for implementing a vibration apparatus which can enhance a sound pressure level of various sound bands. Through the various experiments, the inventors have invented an apparatus including a new vibration apparatus, which can enhance a sound pressure level of the low-pitched sound band (e.g., improved bass range).

An aspect of the present disclosure is directed to providing an apparatus which can enhance a sound characteristic and a sound pressure level characteristic of various-pitched sound bands generated based on a vibration of a passive vibration member.

Another aspect of the present disclosure is directed to providing an apparatus which can enhance a sound characteristic and a sound pressure level characteristic of a middle-low-pitched sound band or a middle-high-pitched sound band generated based on a vibration of a passive vibration member.

Additional features and aspects will be set forth in part in the description that follows, and in part will be apparent from the description, or can be learned by practice of the inventive concepts provided herein. Other features and aspects of the inventive concepts can be realized and attained by the structure particularly pointed out in the written description, or derivable therefrom, and the claims hereof as well as the appended drawings.

To achieve these and other aspects of the inventive concepts, as embodied and broadly described herein, an apparatus comprises a vibration apparatus connected to a rear surface of a passive vibration member, and a supporting member at the rear surface of the passive vibration member, the vibration apparatus comprises a first vibration portion, a second vibration portion connected to a periphery of the first vibration portion, and a connection portion connected to a periphery of the second vibration portion and the rear surface of the passive vibration member. Also, the vibration apparatus can be referred to as a vibration device.

In another aspect, an apparatus comprises a plurality of vibration apparatuses connected to a rear surface of a passive vibration member, and a supporting member at the rear surface of the passive vibration member, each of the plurality of vibration apparatuses comprises a first active vibration member, a 2-1$^{st}$ active vibration member and a 2-2$^{nd}$ active vibration member connected to a periphery of the first active vibration member in parallel with a center portion of the first active vibration member therebetween, and a connection portion connected to the rear surface of the passive vibration member and each of the 2-1$^{st}$ active vibration member and the 2-2$^{nd}$ active vibration member.

According to an embodiment of the present disclosure, an apparatus for enhancing a sound pressure level of the low-pitched sound band generated based on a vibration of a passive vibration member can be provided (e.g., improved bass).

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed

BRIEF DESCRIPTION OF THE DRAWINGS

The companying drawings, which are included to provide a further understanding of the disclosure and are incorporated in and constitute a part of this application, illustrate aspects and embodiments of the disclosure and together with the description serve to explain principles of the disclosure.

Figure 1:
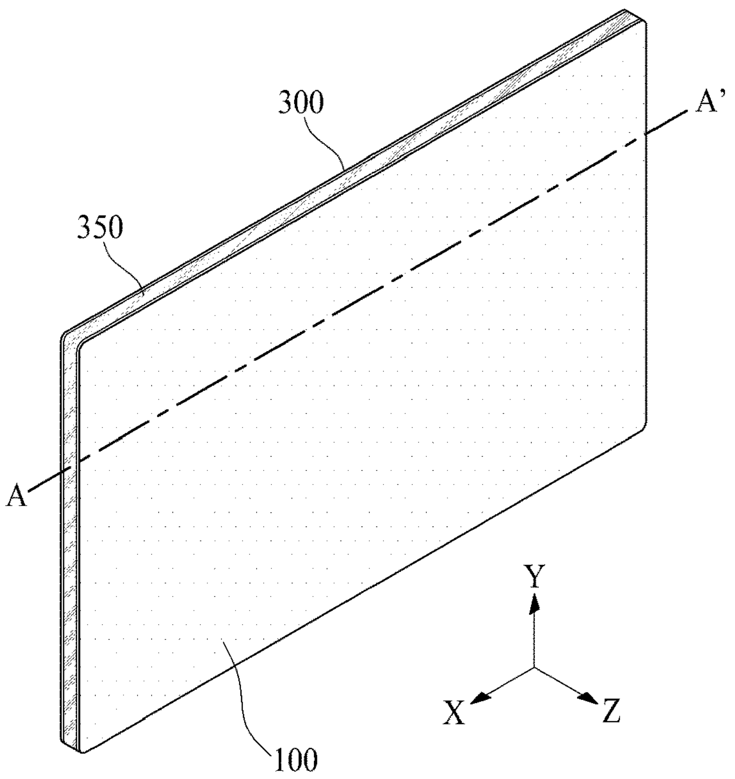
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Same reference numerals designate same elements throughout. Names of the respective elements used in the following explanations are selected only for convenience of writing the specification and can be thus different from those used in actual products.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, For example, when a position relation between two parts is described as, For example, "on," "above," "over," "under," and "next," one or more other parts can be disposed between the two parts unless a more limiting term, such as "just" or "direct(ly)" is used. In the description of embodiments, when a structure is described as being positioned "on or above" or "under or below" another structure, this description should be construed as including a situation in which the structures contact each other as well as a situation in which a third structure is disposed therebetween.

In describing a time relationship, For example, when the temporal order is described as, For example, "after," "subsequent," "next," and "before," or the like a situation that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings. All the components of each apparatus according to all embodiments of the present disclosure are operatively coupled and configured. In addition, for convenience of description, a scale, size and thickness of each of elements illustrated in the accompanying drawings differs from a real scale, and thus, embodiments of the present disclosure are not limited to a scale illustrated in the drawings.

Figure 2:
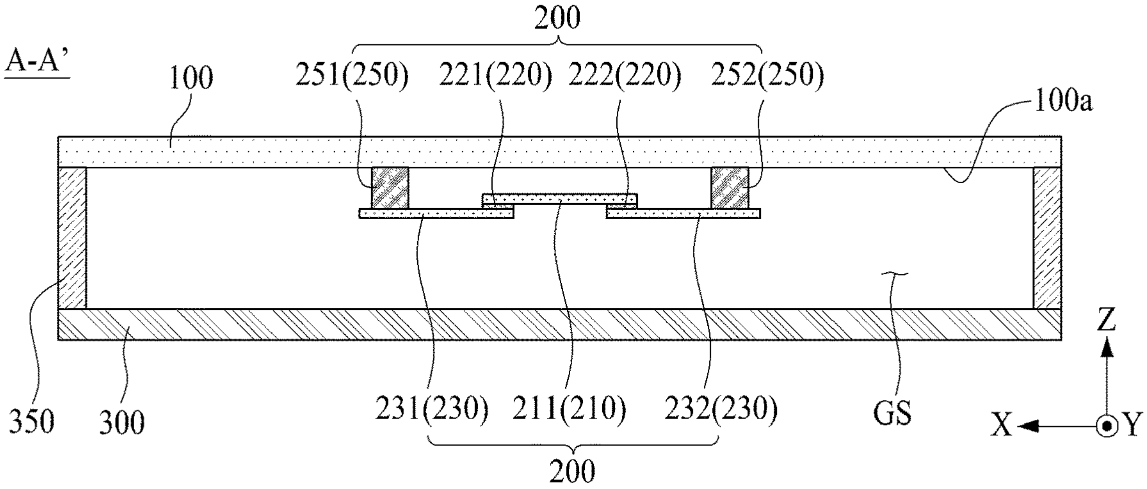
FIG. 2 is a cross-sectional view taken along line A-A' illustrated in FIG. 1 according to an embodiment of the present disclosure.

FIG. 1 illustrates an apparatus according to an embodiment of the present disclosure, and FIG. 2 is a cross-sectional view taken along line A-A' illustrated in FIG. 1.

With reference to FIGS. 1 and 2, the apparatus according to an embodiment of the present disclosure can include a passive vibration member 100 and a vibration apparatus 200. For example, the vibration apparatus 200 can move and vibration the passive vibration member 100.

The apparatus according to an embodiment of the present disclosure can be a display apparatus, a sound apparatus, a sound generating apparatus, a sound bar, an analog signage, or a digital signage, or the like, but embodiments of the present disclosure are not limited thereto.

The display apparatus can include a display panel including a plurality of pixels which implement a black/white or color image and a driving part for driving the display panel. For example, the display panel can be an organic light-emitting display panel, a light-emitting diode display panel, an electrophoresis display panel, an electro-wetting display panel, a micro light-emitting diode display panel, or a quantum dot light-emitting display panel, or the like, but embodiments of the present disclosure are not limited thereto. For example, in the organic light-emitting display panel, a pixel can include an organic light-emitting device such as an organic light-emitting layer or the like, and the pixel can be a subpixel which implements any one of a plurality of colors configuring a color image. Thus, an apparatus according to a first embodiment of the present disclosure can include a set device (or a set apparatus) or a set electronic device such as a notebook computer, a TV, a computer monitor, an equipment apparatus including an automotive apparatus or another type apparatus for vehicles, or a mobile electronic device such as a smartphone, or an electronic pad, or the like which is a complete product (or a final product) including a display panel such as an organic light-emitting display panel, a liquid crystal display panel, or the like.

The analog signage can be an advertising signboard, a poster, a noticeboard, or the like. The analog signage can include signage content such as a sentence, a picture, and a sign, or the like. The signage content can be disposed at the passive vibration member 100 of the apparatus to be visible. For example, the signage content can be directly attached on the passive vibration member 100 and the signage content can be printed or the like on a medium such as paper, and the medium can be attached on the passive vibration member 100. Also, the apparatus according to an embodiment of the present disclosure can be included in a vehicle, and the vibration apparatus 200 can be applied to a roof, a ceiling panel, a door panel, a dash board panel, and a vehicle column, etc.

The passive vibration member 100 can vibrate based on driving (or vibration or displacing) of the vibration apparatus 200. For example, the passive vibration member 100 can generate one or more of a vibration and a sound based on driving of the vibration apparatus 200.

The passive vibration member 100 according to an embodiment of the present disclosure can be a display panel including a display area (or a screen) having a plurality of pixels which implement a black/white or color image. Thus, the passive vibration member 100 can generate one or more of a vibration and a sound based on driving of the vibration apparatus 200. For example, the passive vibration member 100 can vibrate based on a vibration of the vibration apparatus 200 while a display area is displaying an image, and thus, can generate or output a sound synchronized with the image displayed on the display area.

The passive vibration member 100 according to another embodiment of the present disclosure can be a non-display panel instead of a display panel. For example, the passive vibration member 100 can be a vibration plate which includes one or more materials of wood, rubber, plastic, flexible glass, fiber, cloth, paper, metal, carbon, a mirror, and leather, but embodiments of the present disclosure are not limited thereto.

The passive vibration member 100 according to an embodiment of the present disclosure can be a vibration object, a display member, a display panel, a signage panel, a passive vibration plate, a front cover, a front member, a vibration panel, a sound panel, or a passive vibration panel, but embodiments of the present disclosure are not limited thereto.

The vibration apparatus 200 can be configured to vibrate the passive vibration member 100. The vibration apparatus 200 can be configured to be connected to a rear surface of the passive vibration member 100. Accordingly, the vibration apparatus 200 can vibrate the passive vibration member 100 to generate or output one or more of a vibration and a sound based on a vibration of the passive vibrating member 100. Also, the vibration apparatus 200 can be referred to as a vibration device.

The vibration apparatus 200 can be connected to or coupled to the rear surface of the passive vibration member 100. The vibration apparatus 200 can be configured to vibrate the passive vibration member 100 based on a synthesis vibration (or displacement) of a plurality of active vibration members 210 and 230. For example, the vibration apparatus 200 can include the plurality of active vibration members 210 and 230 which are connected with each other so that portions thereof overlap each other, and can be configured to vibrate the passive vibration member 100 based on the synthesis vibration (or displacement) of the plurality of active vibration members 210 and 230. Accordingly, a displacement width (or a vibration width) of the vibration apparatus 200 can increase based on the synthesis vibration (or displacement) of the plurality of active vibration members 210 and 230, and thus, a displacement width (or a vibration width) of the passive vibration member 100 can increase or be maximized, thereby enhancing a sound characteristic and a sound pressure level characteristic of a low-pitched sound band generated based on a vibration of the passive vibration member 100. For example, the plurality of active vibration members 210 and 230 can be stacked or overlapped to form an arch type structure or a bridge type structure, which can resonate or vibrate to generate a longer wavelength for providing lower frequencies.

The apparatus according to an embodiment of the present disclosure can further include a supporting member 300 and a coupling member 350.

The supporting member 300 can be disposed at a rear surface 100*a* of the passive vibration member 100. The supporting member 300 can be disposed at the rear surface 100*a* of the passive vibration member 100 to cover the vibration apparatus 200. The supporting member 300 can be disposed at the rear surface 100*a* of the passive vibration member 100 to cover all of the rear surface 100*a* or a portion of the rear surface 100*a* of the passive vibration member 100 and the vibration apparatus 200. For example, the supporting member 300 can have the same size as the passive vibration member 100. For example, the supporting member 300 can cover a whole rear surface of the passive vibration member 100 with a gap space GS and the vibration apparatus 200 therebetween. The gap space GS can be provided by the coupling member 350 disposed between the passive vibration member 100 and the supporting member 300 facing each other. The gap space GS can be referred to as an air gap, an accommodating space, a resonance chamber, a sound chamber, a vibration space, or a sound sounding box, but embodiments of the present disclosure are not limited thereto.

The supporting member 300 can include at least one or more of a glass material, a metal material, and a plastic material. For example, the supporting member 300 can include a stacked structure in which at least one or more of a glass material, a plastic material, and a metal material is stacked thereof. For example, the supporting member 300 can include a material which has relatively high stiffness or high hardness, compared to the passive vibration member 100 (e.g., supporting member 300 can be stiffer than to the passive vibration member 100). For example, the supporting member 300 can be a rear structure, a supporting structure, a supporting plate, a supporting cover, a rear cover, a housing, or a rear member, but embodiments of the present disclosure are not limited thereto.

Each of the passive vibration member 100 and the supporting member 300 can have a square shape or a rectangular shape, but embodiments of the present disclosure are not limited thereto, and can have a polygonal shape, a non-polygonal shape, a circular shape, a triangular shape or an oval shape. For example, when the apparatus according to another embodiment of the present disclosure is applied to a sound apparatus or a sound bar, each of the passive vibration member 100 and the supporting member 300 can have a rectangular shape where a length of a long side is twice or more times longer than a short side, but embodiments of the present disclosure are not limited thereto.

The coupling member 350 can be configured to be connected between a rear periphery portion of the passive vibration member 100 and a front periphery portion of the supporting member 300, and thus, the gap space GS can be provided between the passive vibration member 100 and the supporting member 300 facing each other.

The coupling member 350 according to an embodiment of the present disclosure can include an elastic material which has adhesive properties and is capable of compression and decompression. For example, the coupling member 350 can include a double-sided tape, a single-sided tape, or a double-sided adhesive foam pad, but embodiments of the present disclosure are not limited thereto, and can include an elastic pad such as a rubber pad or a silicone pad, or the like, which has adhesive properties and is capable of compression and decompression. For example, the coupling member 350 can be formed by elastomer.

According to another embodiment of the present disclosure, the supporting member 300 can further include a sidewall portion which supports a rear periphery portion of the passive vibration member 100. The sidewall portion of the supporting member 300 can protrude or be bent toward the rear periphery portion of the passive vibration member 100 from the front periphery portion of the supporting member 300, and thus, the gap space GS can be provided between the passive vibration member 100 and the supporting member 300. For example, the coupling member 350 can be configured to be connected between the sidewall portion of the supporting member 300 and the rear periphery portion of the passive vibration member 100.

Accordingly, the supporting member 300 can cover the vibration apparatus 200 and can support the rear surface 100*a* of the passive vibration member 100. For example, the supporting member 300 can cover the vibration apparatus 200 and can support the rear periphery portion of the passive vibration member 100.

According to another embodiment of the present disclosure, the passive vibration member 100 can further include a sidewall portion which is connected to a front periphery portion of the supporting member 300. The sidewall portion of the passive vibration member 100 can protrude or be bent toward the front periphery portion of the supporting member 300 from the rear periphery portion of the passive vibration member 100, and thus, the gap space GS can be provided between the passive vibration member 100 and the supporting member 300. A stiffness of the passive vibration member 100 can be increased based on the sidewall portion. For example, the coupling member 350 can be configured to be connected between the sidewall portion of the passive vibration member 100 and the front periphery portion of the supporting member 300. Accordingly, the supporting member 300 can cover the vibration apparatus 200 and can support the rear surface 100*a* of the passive vibration member 100. For example, the supporting member 300 can cover the vibration apparatus 200 and can support the rear periphery portion of the passive vibration member 100.

Figure 3:
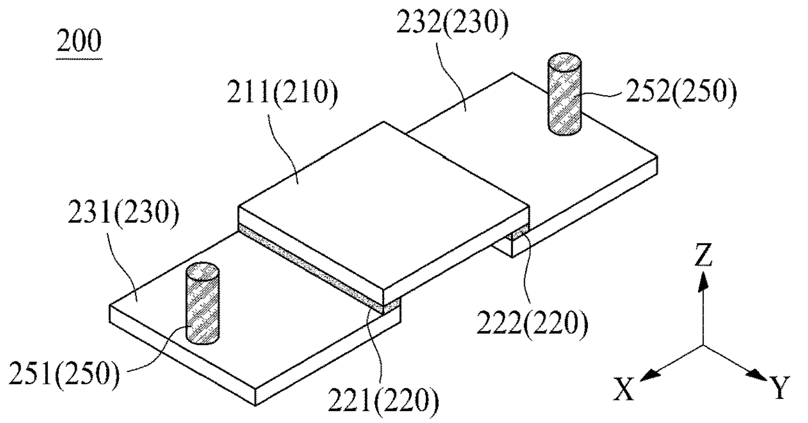
FIG. 3 illustrates a vibration apparatus according to a first embodiment of the present disclosure illustrated in FIG. 2.

FIG. 3 illustrates a vibration apparatus according to a first embodiment of the present disclosure illustrated in FIG. 2.

With reference to FIGS. 2 and 3, a vibration apparatus 200 according to a first embodiment of the present disclosure can include a first vibration portion 210, a second vibration portion 230, and a connection portion 250.

The first vibration portion 210 can be disposed to face a rear surface 100*a* of the passive vibration member 100. For example, the first vibration portion 210 can be disposed between the rear surface 100*a* of the passive vibration member 100 and a supporting member 300. For example, the first vibration portion 210 can be disposed between the rear surface 100*a* of the passive vibration member 100 and the supporting member 300 to be spaced apart from the passive vibration member 100 without being directly connected to the passive vibration member 100. For example, the first vibration portion 210 can be a main vibration portion, a center vibration portion, or a first active vibration portion (e.g., the first vibration portion 210 can form a center of an arch or bridge type structure).

The first vibration portion 210 according to an embodiment of the present disclosure can include a first active vibration member 211. The first active vibration member 211 can have a rectangular shape or a square shape. The first active vibration member 211 can be implemented to vibrate (or displace or drive) in a flexural shape, based on a first driving signal input from the outside.

The second vibration portion 230 can be connected to or coupled to a periphery of the first vibration portion 210. The second vibration portion 230 can overlap a periphery of the first vibration portion 210. For example, the second vibration portion 230 can overlap a portion of the periphery of the first vibration portion 210. For example, the second vibration portion 230 can be connected to or coupled to a periphery portion of the first vibration portion 210. For example, the second vibration portion 230 can be a sub vibration portion, a secondary vibration portion, or a second active vibration portion.

The second vibration portion 230 can include a plurality of second active vibration members 231 and 232. For example, the second vibration portion 230 can include a 2-1$^{st}$ active vibration member 231 and a 2-2$^{nd}$ active vibration member 232. For example, the second vibration portion 230 can include 2N (where N is a natural number) number of second active vibration members 231 and 232. For example, the 2N number of second active vibration members 231 and 232 can include the 2-1$^{st}$ active vibration member 231 and the 2-2$^{nd}$ active vibration member 232. For example, the 2-1$^{st}$ active vibration member 231 and the 2-2$^{nd}$ active vibration member 232 can be a pair of second active vibration members. In the present disclosure, the 2-1$^{st}$ active vibration member 231 and the 2-2$^{nd}$ active vibration member 232 can be a second active vibration member and a third active vibration member, but embodiments of the present disclosure are not limited to digits "2-1$^{st}$" and "2-2$^{nd}$".

Each of the 2-1$^{st}$ active vibration member 231 and the 2-2$^{nd}$ active vibration member 232 can be connected or coupled to a periphery of the first active vibration member 211 in parallel with a center portion (or a center region) of the first active vibration member 211 therebetween. For example, the 2-1$^{st}$ active vibration member 231 and the 2-2$^{nd}$ active vibration member 232 can be connected or coupled to the periphery of the first active vibration member 211 to be symmetric with each other with the center portion of the first active vibration member 211 therebetween.

Each of the 2-1$^{st}$ active vibration member 231 and the 2-2$^{nd}$ active vibration member 232 can include a first connection region and a second connection region, which are parallel or symmetric with each other with the center portion therebetween. The first connection region can include at least a portion of a first periphery portion of each of the 2-1$^{st}$ active vibration member 231 and the 2-2$^{nd}$ active vibration member 232 overlapping the periphery of the first active vibration member 211. The second connection region can include at least a portion of a second periphery portion of each of the 2-1$^{st}$ active vibration member 231 and the 2-2$^{nd}$ active vibration member 232 connected to the passive vibration member 100.

According to an embodiment of the present disclosure, each of the passive vibration member 100 and the supporting member 300 can have a square shape or a rectangular shape, but embodiments of the present disclosure are not limited thereto. For example, each of the 2-1$^{st}$ active vibration member 231 and the 2-2$^{nd}$ active vibration member 232 can have a polygonal shape, a non-polygonal shape, a circular shape, a triangular shape or an oval shape where the 2-1$^{st}$ active vibration member 231 and the 2-2$^{nd}$ active vibration member 232 are symmetric with each other with respect to the center portion of the first active vibration member 211. For example, each of the 2-1$^{st}$ active vibration member 231 and the 2-2$^{nd}$ active vibration member 232 can be configured to have the same shape and the same size as the first active vibration member 211, but embodiments of the present disclosure are not limited thereto. For example, each of the 2-1$^{st}$ active vibration member 231 and the 2-2$^{nd}$ active vibration member 232 can be configured to have the same shape as and different size from the first active vibration member 211, but embodiments of the present disclosure are not limited thereto. Also, each of the first active vibration member 211, the 2-1$^{st}$ active vibration member 231 and the 2-2$^{nd}$ active vibration member 232 can have different shapes.

Each of the 2-1$^{st}$ active vibration member 231 and the 2-2$^{nd}$ active vibration member 232 can be implemented to vibrate (or displace) in a flexural shape, based on the same second driving signal, but embodiments of the present disclosure are not limited thereto. For example, the 2-1$^{st}$ active vibration member 231 and the 2-2$^{nd}$ active vibration member 232 can be implemented to vibrate (or displace) based on different second driving signals, and thus, can change a vibration width of a vibration and a displacement force transferred to the passive vibration member 100 to implement sounds of various-pitched sound bands. For example, the first active vibration member 211, the 2-1$^{st}$ active vibration member 231 and the 2-2$^{nd}$ active vibration member 232 together can form a structure that has a length set to be a fraction a desired wavelength or a multiple of a desired wavelength for improving a frequency response for a given range.

According to an embodiment of the present disclosure, the second driving signal applied to each of the 2-1$^{st}$ active vibration member 231 and the 2-2$^{nd}$ active vibration member 232 can be the same as or different from the first driving signal applied to the first active vibration member 211. As an embodiment of the present disclosure, the first driving signal can have the same phase (or in-phase) as the second driving signal, or can have opposite phases (or anti-phases) with respect to a phase of the second driving signal. As another embodiment of the present disclosure, the first driving signal and the second driving signal can have the same period and can have the same amplitude or different amplitudes, but embodiments of the present disclosure are not limited thereto.

Each of the first active vibration member 211, the 2-1$^{st}$ active vibration member 231, and the 2-2$^{nd}$ active vibration member 232 can include a vibration device.

The vibration device can vibrate (or displace or drive) based on a driving signal input thereto. The vibration device can vibrate (or displace or drive) as contraction and expansion are alternately repeated based on a piezoelectric effect (or a piezoelectric characteristic) according to a driving signal applied from the outside. The driving signal can be an alternating current (AC) signal such as a sound signal, a vibration driving signal, or a voice signal, or the like. The vibration device of the first active vibration member 211 can vibrate (or displace or drive) based on a first driving signal input thereto. The vibration device of each of the 2-1$^{st}$ active vibration member 231 and the 2-2$^{nd}$ active vibration member 232 can vibrate (or displace or drive) together based on a second driving signal input thereto.

The vibration device according to an embodiment of the present disclosure can be a single-layer vibration device or a stack type vibration device having multiple layers, but embodiments of the present disclosure are not limited. The vibration device can include one or more piezoelectric devices having a piezoelectric characteristic. The piezoelectric device can be a device which is displaced by an inverse piezoelectric effect when a driving signal (or a voltage) based on a sound signal input thereto is input thereto. The piezoelectric device can be a device which is flexurally displaced (or flexurally vibrated or flexurally driven) based on a voltage like bimorph and unimorph, or the like.

The second vibration portion 230 can be coupled to or attached on the periphery of the first vibration portion 210 by an adhesive member 220. Each of the 2-1$^{st}$ active vibration member 231 and the 2-2$^{nd}$ active vibration member 232 can be coupled to or attached on the periphery of the first active vibration member 211 by the adhesive member 220. Accordingly, each of the 2-1$^{st}$ active vibration member 231 and the 2-2$^{nd}$ active vibration member 232 can be connected to the first active vibration member 211 by the adhesive member 220, and thus, can receive a vibration (or displacement) of the first active vibration member 211 to vibrate (or displace).

The adhesive member 220 can be disposed or interposed between the first active vibration member 211 and each of the 2-1$^{st}$ active vibration member 231 and the 2-2$^{nd}$ active vibration member 232. The adhesive member 220 can be disposed or interposed between a front periphery portion of the first active vibration member 211 and a periphery portion of each of the 2-1$^{st}$ active vibration member 231 and the 2-2$^{nd}$ active vibration member 232. The adhesive member 220 according to an embodiment of the present disclosure can include a first adhesive member 221 and a second adhesive member 222.

The first adhesive member 221 can be disposed or interposed between the 2-1$^{st}$ active vibration member 231 and the first active vibration member 211. For example, the first adhesive member 221 can be connected between the first connection region of the 2-1$^{st}$ active vibration member 231 and a first periphery portion of the first active vibration member 211.

For example, the first adhesive member 221 can be connected between a first front periphery portion of the 2-1$^{st}$ active vibration member 231 and a first rear periphery portion of the first active vibration member 211. Accordingly, the first periphery portion of the 2-1$^{st}$ active vibration member 231 can be connected to the first periphery portion of the first active vibration member 211 by the first adhesive member 221, and thus, can vibrate (or displace) based on a vibration (or displacement) of the first active vibration member 211.

The second adhesive member 222 can be disposed or interposed between the 2-2$^{nd}$ active vibration member 232 and the first active vibration member 211. For example, the second adhesive member 222 can be connected between the first connection region of the 2-2$^{nd}$ active vibration member 232 and a second periphery portion of the first active vibration member 211. For example, the second adhesive member 222 can be connected between a first front periphery portion of the 2-2$^{nd}$ active vibration member 232 and a second rear periphery portion of the first active vibration member 211. Accordingly, the first periphery portion of the 2-2$^{nd}$ active vibration member 232 can be connected to the second periphery portion of the first active vibration member 211 by the second adhesive member 222, and thus, can vibrate (or displace) based on a vibration (or displacement) of the first active vibration member 211.

According to another embodiment of the present disclosure, the adhesive member 220 can be disposed or interposed between the front periphery portion of the first active vibration member 211 and the rear periphery portion of each of the 2-1$^{st}$ active vibration member 231 and the 2-2$^{nd}$ active vibration member 232. For example, the first adhesive member 221 can be connected between the first rear periphery portion of the 2-1$^{st}$ active vibration member 231 and the first front periphery portion of the first active vibration member 211. For example, the second adhesive member 222 can be connected between the first rear periphery portion of the 2-2$^{nd}$ active vibration member 232 and the second front periphery portion of the first active vibration member 211.

Each of the first adhesive member 221 and the second adhesive member 222 according to an embodiment of the present disclosure can be configured as an adhesive material capable of compression and decompression. For example, each of the first adhesive member 221 and the second adhesive member 222 can be configured as an adhesive material which is low in elastic modulus. Each of the first adhesive member 221 and the second adhesive member 222 can be configured as an adhesive resin material, an adhesive, or an adhesive tape, or adhesive film, or the like, but embodiments of the present disclosure are not limited thereto. The adhesive resin material can include one of an epoxy-based resin material, an acrylic-based resin material, and a silicone-based resin material, but embodiments of the present disclosure are not limited thereto. For example, each of the first adhesive member 221 and the second adhesive member 222 can include an acrylic adhesive material having a characteristic which is relatively good in adhesive force and high in hardness of acrylic and urethane so that a vibration of the first active vibration member 211 is well transferred to the first periphery portion of each of the 2-1$^{st}$ active vibration member 231 and the 2-2$^{nd}$ active vibration member 232, but embodiments of the present disclosure are not limited thereto.

The adhesive resin, the adhesive, or the adhesive layer of the adhesive member 220 according to an embodiment of the present disclosure can include a photo-curable adhesive material, but embodiments of the present disclosure are not limited thereto. For example, the adhesive resin, the adhesive, or the adhesive layer of the adhesive member 220 can be an ultraviolet (UV) adhesive, but embodiments of the present disclosure are not limited thereto.

The connection portion 250 can be connected or coupled to a periphery of the second vibration portion 230 and the rear surface 100*a* of the passive vibration member 100. For example, the connection portion 250 can include 2N (where N is a natural number) number of connection members 251 and 252 which are connected to each of the passive vibration member 100 and the 2N number of second active vibration members 231 and 232. The connection portion 250 can include a first connection member 251 and a second connection member 252 which are connected to the passive vibration member 100 and each of the 2-1$^{st}$ active vibration member 231 and the 2-2$^{nd}$ active vibration member 232. For example, the 2N number of connection members 251 and 252 can include a first connection member 251 and a second connection member 252.

Each of the first and second connection members 251 and 252 can have a polygonal pillar shape or a circular pillar shape or a peg shape, but embodiments of the present disclosure are not limited thereto. According to an embodiment of the present disclosure, each of the first and second connection members 251 and 252 can include an elastic material having elasticity or flexibility. For example, each of the first and second connection members 251 and 252 can be configured as an elastic body having an elastic modulus (or Young's modulus) which is lower than each of the 2-1$^{st}$ active vibration member 231 and the 2-2$^{nd}$ active vibration member 232. For example, each of the first and second connection members 251 and 252 can include a double-sided tape, an adhesive film, a single-sided tape, or a double-sided adhesive foam pad, but embodiments of the present disclosure are not limited thereto, and can include an elastic pad such as a rubber pad or a silicone pad, or the like, which has adhesive properties and is capable of compression and decompression. For example, an adhesive layer of each of the first and second connection members 251 and 252 can include an acrylic-based adhesive material having a characteristic which is relatively good in adhesive force and high in hardness, but embodiments of the present disclosure are not limited thereto. For example, each of the first and second connection members 251 and 252 can be formed by elastomer.

The first connection member (or a first elastic member) 251 can be disposed or connected between the 2-1$^{st}$ active vibration member 231 and the passive vibration member 100. For example, the first connection member 251 can be connected between the second connection region of the 2-1$^{st}$ active vibration member 231 and the rear surface 100*a* of the passive vibration member 100. For example, the first connection member 251 can be connected between the second front periphery portion of the 2-1$^{st}$ active vibration member 231 and the rear surface 100*a* of the passive vibration member 100. For example, the first active vibration member 211, the 2-1$^{st}$ active vibration member 231 and the 2-2$^{nd}$ active vibration member 232 can overlap portions of each other to form a type of bridge or arch type structure between the first connection member 251 and the second connection member 252. Accordingly, the second periphery portion of the 2-1$^{st}$ active vibration member 231 can be connected to the passive vibration member 100 by the first connection member 251, and thus, can vibrate (or displace or drive) the passive vibration member 100 based on vibrations of the first active vibration member 211 and the 2-1$^{st}$ active vibration member 231. In addition, the mass of both ends of the 2-1$^{st}$ active vibration member 231 can increase due to the first connection member 251 and the first active vibration member 211 and elasticity can increase based on a composite action of a modulus of the first connection member 251 and a self-modulus of the first active vibration member 211, and thus, a vibration width (or a displacement width) can increase.

The second connection member (or a second elastic member) 252 can be disposed or connected between the 2-2$^{nd}$ active vibration member 232 and the passive vibration member 100. For example, the second connection member 252 can be connected between the second connection region of the 2-2$^{nd}$ active vibration member 232 and the rear surface 100*a* of the passive vibration member 100. For example, the second connection member 252 can be connected between the second front periphery portion of the 2-2$^{nd}$ active vibration member 232 and the rear surface 100*a* of the passive vibration member 100. Accordingly, the second periphery portion of the 2-2$^{nd}$ active vibration member 232 can be connected to the passive vibration member 100 by the second connection member 252, and thus, can vibrate (or displace or drive) the passive vibration member 100 based on vibrations of the first active vibration member 211 and the 2-2$^{nd}$ active vibration member 232. In addition, the mass of both ends of the 2-2$^{nd}$ active vibration member 232 can increase due to the second connection member 252 and the first active vibration member 211 and elasticity can increase based on a composite action of a modulus of the second connection member 252 and a self-modulus of the first active vibration member 211, and thus, a vibration width (or a displacement width) can increase.

As described above, the vibration apparatus 200 according to the first embodiment of the present disclosure can have a large vibration width (or a large displacement width) based on a synthesis vibration (or a composite vibration) of the 2-1$^{st}$ active vibration member 231 and the 2-2$^{nd}$ active vibration member 232 in driving (or vibrating or displacing), and thus, a vibration width (or a displacement width) of the passive vibration member 100 can increase, thereby enhancing a sound characteristic and/or a sound pressure level characteristic of the low-pitched sound band generated based on a vibration of the passive vibration member 100. For example, the combined structure of the first active vibration member 211, the 2-1$^{st}$ active vibration member 231 and the 2-2$^{nd}$ active vibration member 232 can vibrate together as one unit having a longer length, which can help improve reproduction of sounds in low frequency ranges (e.g., improved bass or low range response). Also, the combined structure has a larger mass, which can help better produce sounds in low frequencies. For example, the longer length and/or the increased mass of the combined structure can help better provide sounds having a longer wavelength.

Figure 4:
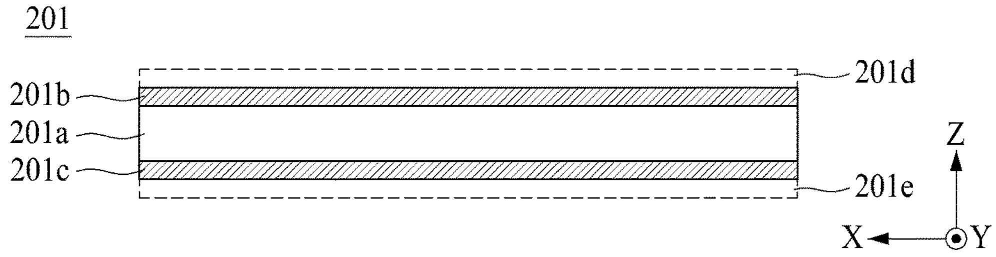
FIG. 4 illustrates a vibration device according to an embodiment of the present disclosure.

FIG. 4 illustrates a vibration device according to an embodiment of the present disclosure. FIG. 4 illustrates a vibration device of an active vibration member illustrated in FIGS. 2 and 3 an embodiment of the present disclosure.

With reference to FIGS. 2 to 4, each of the first active vibration member 211, the 2-1$^{st}$ active vibration member 231, and the 2-2$^{nd}$ active vibration member 232 can include a vibration device 201.

The vibration device 201 can be a single-layer vibration device. The single-layer vibration device can include a piezoelectric layer 201*a*, one or more first electrodes (or a first electrode layer) 201*b* disposed at a first surface of the piezoelectric layer 201*a*, and one or more second electrodes (or a second electrode layer) 201*c* disposed at a second surface different from the first surface of the piezoelectric layer 201*a*. For example, the piezoelectric layer 201*a* can include a front surface and a rear surface. For example, the first surface of the piezoelectric layer 201*a* can be a first region of the front surface (or the rear surface) of the piezoelectric layer 201*a*, and the second surface of the piezoelectric layer 201*a* can be a second region which is spaced apart from the first region among the front surface (or the rear surface) of the piezoelectric layer 201*a*. For example, the first surface of the piezoelectric layer 201*a* can be the front surface of the piezoelectric layer 201*a*, and the second surface of the piezoelectric layer 201*a* can be the rear surface of the piezoelectric layer 201*a*.

The single-layer vibration device 201 can further include a first protection member 201*d* covering a first electrode 201*b* and a second protection member 201*e* covering a second electrode 201*c*. The first protection member 201*d* can be attached on the first electrode 201*b* by an adhesive layer or an adhesive film. Alternatively, the first electrode 201*b* can be implemented at the first protection member 201*d* and can be electrically connected to the first surface of a piezoelectric layer 201*a* by a conductive adhesive member. The second protection member 201*e* can be attached on the second electrode 201*c* by an adhesive layer. Alternatively, the second electrode 201*c* can be implemented at the second protection member 201*e* and can be electrically connected to the second surface of a piezoelectric layer 201*a* by a conductive adhesive member.

In the vibration device 201 of the first active vibration member 211, any one of the first protection member 201*d* and the second protection member 201*e* can be connected to or attached on any one of the first protection member 201*d* and the second protection member 201*e*, configured at the vibration device 201 of each of the 2-1$^{st}$ active vibration member 231 and the 2-2$^{nd}$ active vibration member 232, through the adhesive member 220. In each of the 2-1$^{st}$ active vibration member 231 and the 2-2$^{nd}$ active vibration member 232, any one of the first protection member 201*d* and the second protection member 201*e* of the vibration device 201 can be connected to or coupled to the passive vibration member 100 through the connection portion 250.

Alternatively, the vibration device 201 according to another embodiment of the present disclosure can be a stack-type vibration device. The stack-type vibration device 201 can include a plurality of piezoelectric devices. For example, an electrode interposed (or disposed) between two piezoelectric devices vertically adjacent to each other among a plurality of piezoelectric devices can be used as a common electrode which applies the same driving signal to each of the two piezoelectric devices vertically adjacent to each other, but embodiments of the present disclosure are not limited thereto. For example, an insulation layer having elasticity can be interposed (or disposed) between the two piezoelectric devices vertically adjacent to each other among the plurality of piezoelectric devices. For example, the insulation layer having elasticity can increase a mass of the piezoelectric device or the vibration device 201, and thus, can act as a mass which reduces or lowers a resonance frequency (or a natural frequency) of the piezoelectric device or the vibration device 201. In the vibration device 201 according to another embodiment of the present disclosure, an uppermost piezoelectric device of the plurality of piezoelectric devices can be covered by the first protection member 201*d*, and a lowermost piezoelectric device of the plurality of piezoelectric devices can be covered by the second protection member 201*e*.

The piezoelectric layer 201*a* according to an embodiment of the present disclosure can be a piezoelectric portion, a piezoelectric structure, a piezoelectric sheet, a piezoelectric ceramic sheet, a piezoelectric plate, a piezoelectric ceramic plate, a vibration generating portion, a displacement portion, a displacement layer, a piezoelectric vibration structure, or a vibration structure, but embodiments of the present disclosure are not limited thereto.

A material of the piezoelectric layer 201*a* according to an embodiment of the present disclosure is not limited thereto, but can include a piezoelectric material of a ceramic-based material capable of implementing a relatively high vibration, or can include a piezoelectric ceramic material having a perovskite-based crystal structure. For example, the piezoelectric layer 201*a* can be configured as a piezoelectric material including lead (Pb) or a piezoelectric material not including lead (Pb). For example, the piezoelectric material including lead (Pb) can include one or more of a lead zirconate titanate (PZT)-based material, a lead zirconate nickel niobate (PZNN)-based material, a lead magnesium niobate (PMN)-based material, a lead nickel niobate (PNN)-based material, a lead zirconate niobate (PZN)-based material, or a lead indium niobate (PIN)-based material, but embodiments of the present disclosure are not limited thereto. For example, the piezoelectric material not including lead (Pb) can include one or more of barium titanate ($BaTiO_3$), calcium titanate ($CaTiO_3$), and strontium titanate ($SrTiO_3$), but embodiments of the present disclosure are not limited thereto.

Figure 5A:
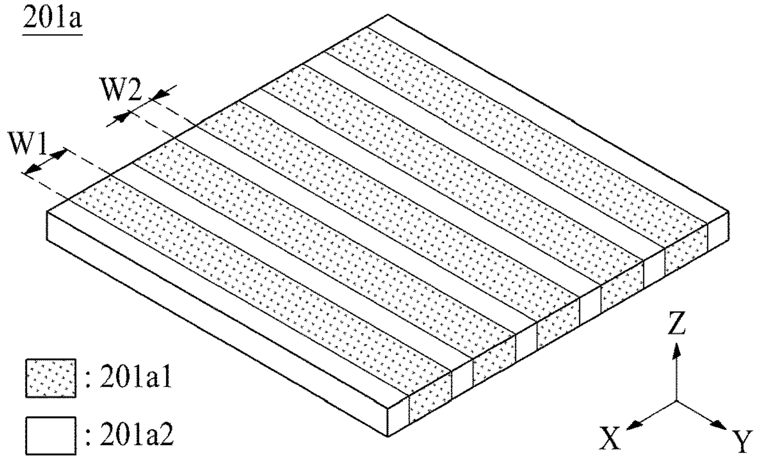
FIGS. 5A and 5B illustrate first and second modification embodiments of the piezoelectric layer illustrated in FIG. 4 according to embodiments of the present disclosure.
Figure 5B:
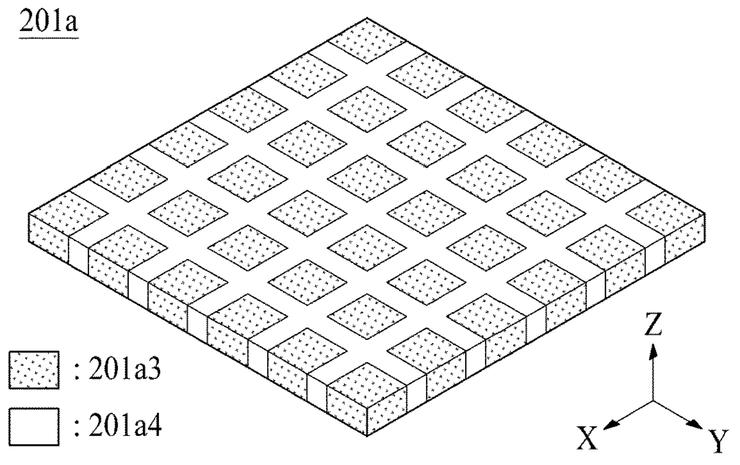

FIGS. 5A and 5B illustrate first and second modification embodiments of the piezoelectric layer illustrated in FIG. 4.

With reference to FIGS. 4 and 5A, the piezoelectric layer 201*a* according to the first modification embodiment of the present disclosure can include a plurality of first portions 201*a*1 and a plurality of second portions 201*a*2. For example, the plurality of first portions 201*a*1 and the plurality of second portions 201*a*2 can be alternately and repeatedly arranged along a first direction X (or a second direction Y). For example, the first direction X can be a widthwise direction of the vibration device 201, the second direction Y can be a lengthwise direction of the vibration device 201, but embodiments of the present disclosure are not limited thereto. For example, the first direction X can be the lengthwise direction of the vibration device 201, and the second direction Y can be the widthwise direction of the vibration device 201.

Each of the plurality of first portions 201*al* can include an inorganic material having a piezoelectric effect (or a piezoelectric characteristic). For example, each of the plurality of first portions 201*al* can include a piezoelectric material, a composite piezoelectric material, or an electroactive material. For example, each of the plurality of first portions 201*al* can be an inorganic portion, an inorganic material portion, a piezoelectric portion, a piezoelectric material portion, or an electroactive portion.

According to an embodiment of the present disclosure, each of the plurality of first portions 201*al* can have a first width W1 parallel to the first direction X and can extend along a second direction Y intersecting the first direction X. Each of the plurality of first portions 201*al* can include a piezoelectric material which is be substantially the same as the piezoelectric layer 201*a* described above with reference to FIG. 4, and thus, the repetitive description thereof can be omitted.

Each of the plurality of second portions 201*a*2 can be disposed between the plurality of first portions 201*al*. For example, each of the plurality of first portions 201*al* can be disposed between two adjacent second portions 201*a*2 among the plurality of second portion 201*a*2. Each of the plurality of second portions 201*a*2 can have a second width W2 parallel to the first direction X (or the second direction Y) and can extend along the second direction Y (or the first direction X). The first width W1 can be the same as or different from the second width W2. For example, the first width W1 can be greater than the second width W2. For example, the first portion 201*al* and the second portion 201*a*2 can include a line shape or a stripe shape which has the same size or different sizes.

Each of the plurality of second portions 201*a*2 can be configured to fill a gap between two adjacent first portions of the plurality of first portions 201*al*. Each of the plurality of second portions 201*a*2 can be configured to fill a gap between two adjacent first portions of the plurality of first portions 201*al* and can be connected to or attached at a first portion 201*al* adjacent thereto. According to an embodiment of the present disclosure, each of the plurality of first portions 201*al* and the plurality of second portions 201*a*2 can be disposed (or arranged) at the same plane (or the same layer) in parallel with each other.

According to an embodiment of the present disclosure, each of the plurality of second portions 201*a*2 can absorb an impact applied to the first portions 201*al*, and thus, can enhance the total durability of the first portions 201*al* and provide flexibility to the vibration device 201. Each of the plurality of second portions 201*a*2 can include an organic material having a flexible characteristic. For example, each of the plurality of second portions 201*a*2 can include one or more of an epoxy-based polymer, an acrylic-based polymer, and a silicone-based polymer, but embodiments of the present disclosure are not limited thereto. For example, each of the plurality of second portions 201*a*2 can be an organic portion, an organic material portion, an adhesive portion, an elastic portion, a bending portion, a damping portion, or a flexible portion, but embodiments of the present disclosure are not limited thereto.

A first surface of each of the plurality of first portions 201*al* and the plurality of second portions 201*a*2 can be connected to the first electrode 201*b* in common. A second surface of each of the plurality of first portions 201*al* and the plurality of second portions 201*a*2 can be connected to the second electrode 201*c* in common.

The plurality of first portions 201*al* and the plurality of second portion 201*a*2 can be disposed on (or connected to) the same plane, and thus, the piezoelectric layer 201*a* according to the first modification embodiment of the present disclosure can have a single thin film-type. Accordingly, the vibration device 201 including the piezoelectric layer 201*a* according to the first modification embodiment of the present disclosure can be vibrated in a vertical direction by the first portions 201*al* having a vibration characteristic and can be bent in a curved shape by the second portions 201*a*2 having flexibility. For example, the vibration device 201 including the piezoelectric layer 201*a* according to the first modification embodiment of the present disclosure can have a 2-2 composite structure, and thus, can have a resonance frequency of 20 kHz or less, but embodiments of the present disclosure are not limited thereto.

With reference to FIGS. 2 to 4 and 5A, when each of the vibration device 201 of the first active vibration member 211, the vibration device 201 of the 2-1$^{st}$ active vibration member 231, and the vibration device 201 of the 2-2$^{nd}$ active vibration member 232 includes a piezoelectric layer 201*a* according to the first modification embodiment of the present disclosure, at least one or more first portions 201*al* disposed at the first and second periphery portions of the vibration device 201 of the first active vibration member 211 can overlap at least a portion of at least one or more first portions 201*al* configured at each of the vibration device 201 of the 2-1$^{st}$ active vibration member 231 and the vibration device 201 of the 2-2$^{nd}$ active vibration member 232. Accordingly, a vibration of the first active vibration member 211 can be efficiently transferred to each of the 2-1$^{st}$ active vibration member 231 and the 2-2$^{nd}$ active vibration member 232.

With reference to FIGS. 4 and 5B, a piezoelectric layer 201*a* according to the second modification embodiment of the present disclosure can include a plurality of first portions 201*a*3, and a second portion 201*a*4 disposed between the plurality of first portions 201*a*3.

Each of the plurality of first portions 201*a*3 can be disposed to be spaced apart from one another along each of the first direction X and the second direction Y. For example, each of the plurality of first portions 201*a*3 can have a hexahedral shape (or a six-sided object shape) having the same size and can be disposed in a lattice shape or a grid shape. Each of the plurality of first portions 201*a*3 can include a piezoelectric material which is be substantially the same as the first portion 201*al* described above with reference to FIG. 5A, and thus, the repetitive description thereof can be omitted.

The second portion 201*a*4 can be disposed between the plurality of first portions 201*a*3 along each of the first direction X and the second direction Y. The second portion 201*a*4 can be configured to fill a gap or a space between two adjacent first portions 201*a*3 or to surround each of the plurality of first portions 201*a*3, and thus, the second portion 201*a*4 can be connected to or attached on an adjacent first portion 201*a*3. The second portion 201*a*4 can include an organic material which is be substantially the same as the second portions 201*a*2 described above with reference to FIG. 5A, and thus, the repetitive description thereof can be omitted.

A first surface of each of the plurality of first portions 201*a*3 and the second portion 201*a*4 can be connected to the first electrode 201*b* in common. A second surface of each of the plurality of first portions 201*a*3 and the second portion 201*a*4 can be connected to the second electrode 201*c* in common.

The plurality of first portions 201*a*3 and the second portion 201*a*4 can be disposed on (or connected to) the same plane, and thus, the piezoelectric layer 201*a* according to the second modification embodiment of the present disclosure can have a single thin film-type. Accordingly, the vibration device 201 including the piezoelectric layer 201*a* according to the second modification embodiment of the present disclosure can be vibrated in a vertical direction by the first portions 201*al* having a vibration characteristic and can be bent in a curved shape by the second portions 201*a*4 having flexibility. For example, the vibration device 201 including the piezoelectric layer 201*a* according to the second modification embodiment of the present disclosure can have a 1-3 composite structure, and thus, can have a resonance frequency of 20 kHz or less, but embodiments of the present disclosure are not limited thereto.

With reference to FIGS. 2 to 4 and 5B, when each of the vibration device 201 of the first active vibration member 211, the vibration device 201 of the 2-1$^{st}$ active vibration member 231, and the vibration device 201 of the 2-2$^{nd}$ active vibration member 232 includes a piezoelectric layer 201*a* according to the second modification embodiment of the present disclosure, at least one or more first portions 201*a*3 disposed at the first and second periphery portions of the vibration device 201 of the first active vibration member 211 can overlap at least a portion of at least one or more first portions 201*a*3 configured at each of the vibration device 201 of the 2-1$^{st}$ active vibration member 231 and the vibration device 201 of the 2-2$^{nd}$ active vibration member 232. Accordingly, a vibration of the first active vibration member 211 can be efficiently transferred to each of the 2-1$^{st}$ active vibration member 231 and the 2-2$^{nd}$ active vibration member 232.

Figure 6A:
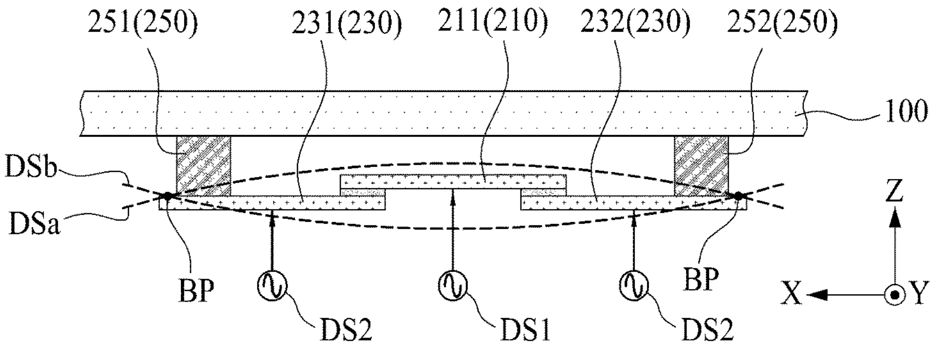
FIGS. 6A and 6B illustrate a displacement point and a vibration width (or a displacement width) of a vibration apparatus based on a driving signal applied to each of the first vibration portion and the second vibration portion illustrated in FIGS. 2 and 3 according to an embodiment of the present disclosure.
Figure 6B:
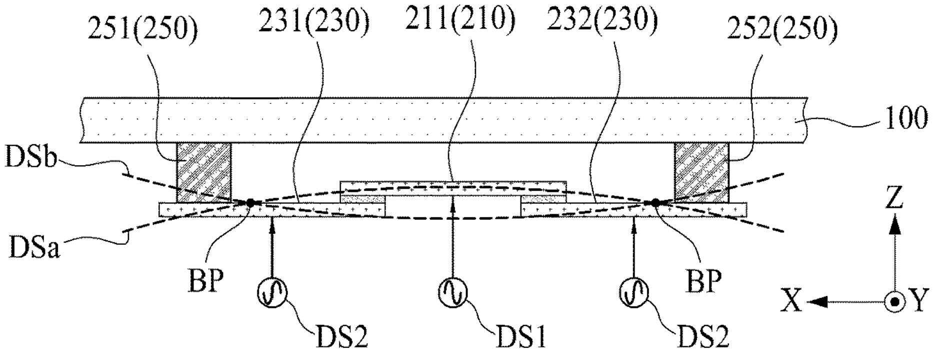

FIGS. 6A and 6B are diagrams illustrating a displacement point and a vibration width (or a displacement width) of a vibration apparatus based on a driving signal applied to each of the first vibration portion and the second vibration portion illustrated in FIGS. 2 and 3.

With reference to FIGS. 2 and 6A, a first driving signal DS1 applied to the first vibration portion 210 can have the same phase as a second driving signal DS2 applied to the second vibration portion 230. Accordingly, the first active vibration member 211 of the first vibration portion 210 and the 2-1$^{st}$ active vibration member 231 and the 2-2$^{nd}$ active vibration member 232 of the second vibration portion 230 can each be displaced (or flexed or vibrated) in the same shape and in the same direction as each other.

When driving signals DS1 and DS2 applied to each of the first active vibration member 211, the 2-1$^{st}$ active vibration member 231, and the 2-2$^{nd}$ active vibration member 232 have the same phase, a total vibration width (or displacement width) of the vibration apparatus 200 can be added to a vibration width (or displacement width) of the first active vibration member 211 and a vibration width (or displacement width) of the 2-1$^{st}$ active vibration member 231 (or the 2-2$^{nd}$ active vibration member 232), and thus, can be increased. For example, a vibration of the first active vibration member 211 and a vibration of each of the 2-1$^{st}$ active vibration member 231 and the 2-2$^{nd}$ active vibration member 232 can be reinforced with each other, and thus, a vibration width (or displacement width) of the vibration apparatus 200 based on a vibration of the first vibration portion 210 and the second vibration portion 230 can be increased.

According to an embodiment of the present disclosure, when a first driving signal DS1 of a positive polarity is applied to the first active vibration member 211, and simultaneously, a second driving signal DS2 of a positive polarity having the same phase as that of the first driving signal DS1 of the positive polarity is applied to each of the 2-1$^{st}$ active vibration member 231 and the 2-2$^{nd}$ active vibration member 232, the first vibration portion 210 and the second vibration portion 230 can be displaced in a first shape (or a convex shape) DSa, and a second periphery portion of each of the 2-1$^{st}$ active vibration member 231 and the 2-2$^{nd}$ active vibration member 232 can be displaced in a direction toward (or closer to) the supporting member 300. On the other hand, when a first driving signal DS1 of a negative polarity is applied to the first active vibration member 211, and simultaneously, a second driving signal DS2 of a negative polarity having the same phase as that of the first driving signal DS1 of a negative polarity is applied to each of the 2-1$^{st}$ active vibration member 231 and the 2-2$^{nd}$ active vibration member 232, the first vibration portion 210 and the second vibration portion 230 can be displaced in a second shape (or a concave shape) DSb opposite to the first shape DSa, and the second periphery portion of each of the 2-1$^{st}$ active vibration member 231 and the 2-2$^{nd}$ active vibration member 232 can be displaced in a direction toward (or closer to) the passive vibration member 100.

Therefore, when driving signals having the same phase are applied to the first vibration portion 210 and the second vibration portion 230, a displacement point BP at which the first shape (or a first vibration shape) DSa of each of the first vibration portion 210 and the second vibration portion 230 displaced by the driving signals DS1 and DS2 of the positive polarity intersects with the second shape (or a second vibration shape) DSb of each of the first vibration portion 210 and the second vibration portion 230 displaced by the driving signals DS1 and DS2 of the negative polarity can be disposed (or located) outside (or an outer portion) of the connection members 251 and 252. For example, the displacement point BP can correspond to a zero point or a center line point of a sine function. Accordingly, when driving signals having the same phase are applied to the first vibration portion 210 and the second vibration portion 230, a vibration width (or displacement amount) of the vibration apparatus 200 can increase, and thus, a vibration width (or displacement amount) of the passive vibration member 100 can increase, thereby enhancing a sound characteristic and a sound pressure level characteristic of the low-pitched sound band generated based on a vibration of the passive vibration member 100 (e.g., the bass range can be improved).

With reference to FIGS. 2 and 6B, a first driving signal DS1 applied to the first vibration portion 210 can have the opposite phase (or anti-phase) as a second driving signal DS2 applied to the second vibration portion 230. Accordingly, the first active vibration member 211 of the first vibration portion 210 and the 2-1$^{st}$ active vibration member 231 and the 2-2$^{nd}$ active vibration member 232 of the second vibration portion 230 can each be displaced (or flexed or vibrated) in a shape which differs from each other.

When the second driving signal DS2 applied to each of the 2-1$^{st}$ active vibration member 231 and the 2-2$^{nd}$ active vibration member 232 has an anti-phase of the first driving signal DS1 applied to the first active vibration member 211, a total vibration width (or displacement amount) of the vibration apparatus 200 can be reduced as a vibration width (or displacement amount) of the 2-1$^{st}$ active vibration member 231 (or the 2-2$^{nd}$ active vibration member 232) is restricted by a vibration width (or displacement amount) of the first active vibration member 211. For example, a vibration of each of the 2-1$^{st}$ active vibration member 231 and the 2-2$^{nd}$ active vibration member 232 can be interfered by a vibration of the first active vibration member 211, and thus, a vibration width of the vibration apparatus 200 based on a vibration of each of the first vibration portion 210 and the second vibration portion 230 can be reduced (e.g., the combined structure can provide a shorter wavelength).

According to an embodiment of the present disclosure, when a first driving signal DS1 of a positive polarity is applied to the first active vibration member 211, and simultaneously, a second driving signal DS2 of a negative polarity having the opposite phase (or anti-phase) as that of the first driving signal DS1 of the positive polarity is applied to each of the 2-1$^{st}$ active vibration member 231 and the 2-2$^{nd}$ active vibration member 232, the first vibration portion 210 and the second vibration portion 230 can be displaced in the second shape DSb, and a second periphery portion of each of the 2-1$^{st}$ active vibration member 231 and the 2-2$^{nd}$ active vibration member 232 can be displaced in a direction toward (or closer to) the passive vibration member 100. On the other hand, when a first driving signal DS1 of a negative polarity is applied to the first active vibration member 211, and simultaneously, a second driving signal DS2 of a positive polarity having the opposite phase (or anti-phase) as that of the first driving signal DS1 of the negative polarity is applied to each of the 2-1$^{st}$ active vibration member 231 and the 2-2$^{nd}$ active vibration member 232, the first vibration portion 210 and the second vibration portion 230 can be displaced in the first shape DSa, and the second periphery portion of each of the 2-1$^{st}$ active vibration member 231 and the 2-2$^{nd}$ active vibration member 232 can be displaced in a direction toward (or closer to) the supporting member 300.

Therefore, when driving signals having the opposite phase (or anti-phase) are applied to the first vibration portion 210 and the second vibration portion 230, the displacement point BP at which the first shape DSa and the second shape DSb of the first vibration portion 210 and the second vibration portion 230 intersect with each other can be disposed (or located) inside (or an inner portion) of the connection members 251 and 252, or can be disposed (or located) a region between the first vibration portion 210 and the connection members 251 and 252. Accordingly, when driving signals having the opposite phase (or anti-phase) are applied to the first vibration portion 210 and the second vibration portion 230, a vibration width (or displacement amount) of the vibration apparatus 200 can decrease, and thus, a vibration width (or displacement amount) of the passive vibration member 100 can decrease, thereby enhancing a sound characteristic and a sound pressure level characteristic of a middle-low-pitched sound band or a middle-high-pitched sound band generated based on a vibration of the passive vibration member 100 (e.g., reproduction of mid-range and high-range sounds can be improved).

According to another embodiment of the present disclosure, at least one or more of a phase and an amplitude of the second driving signal applied to the 2-1$^{st}$ active vibration member 231 can differ from at least one or more of a phase and an amplitude of the second driving signal applied to the 2-2$^{nd}$ active vibration member 232. For example, the displacement point BP at which the first shape DSa and the second shape DSb of the first vibration portion 210 and the second vibration portion 230 intersect with each other can be changed, and thus, a vibration width of a vibration and a displacement force transferred to the passive vibration member 100 can vary, thereby implementing various sounds of various-pitched sound bands (e.g., providing an improved sound range). For example, as a position of the displacement point BP of the first vibration portion 210 and the second vibration portion 230 is changed, a vibration width of a vibration and a displacement force transferred to the passive vibration member 100 can vary, thereby implementing sounds of various-pitched sound bands.

As described above, an apparatus according to an embodiment of the present disclosure can supply driving signals having the same phase to the first vibration portion 210 and the second vibration portion 230 of the vibration apparatus 200, and thus, can increase a vibration width (or a displacement amount) of the passive vibration member 100, thereby enhancing a sound characteristic and a sound pressure level characteristic of the low-pitched sound band generated based on a vibration of the passive vibration member 100.

Also, an apparatus according to an embodiment of the present disclosure can supply driving signals having the opposite phase (or anti-phase) to the first vibration portion 210 and the second vibration portion 230 of the vibration apparatus 200, and thus, can decrease a vibration width (or a displacement amount) of the passive vibration member 100, thereby enhancing a sound characteristic and a sound pressure level characteristic of the middle-low-pitched sound band and/or the middle-high-pitched sound band generated based on a vibration of the passive vibration member 100.

Moreover, the apparatus according to an embodiment of the present disclosure can periodically or alternately supply the driving signals DS1 and DS2 having the same phase and the driving signals DS1 and DS2 having opposite phases (or anti-phases) to the first vibration portion 210 and the second vibration portion 230 of the vibration apparatus 200, and thus, can dynamically adjust (or vary) a vibration width (or a displacement amount) of the first vibration portion 210 and the second vibration portion 230 to adjust (or vary) a vibration width (or a displacement amount) of the passive vibration member 100, thereby generating (or outputting) sounds of various-pitched sound bands based on a vibration of the passive vibration member 100 and enhancing a sound characteristic and a sound pressure level characteristic of various-pitched sound bands. Thus, the vibration apparatus 200 can provide improved sound characteristics (e.g., a wide dynamic range).

Figure 7:
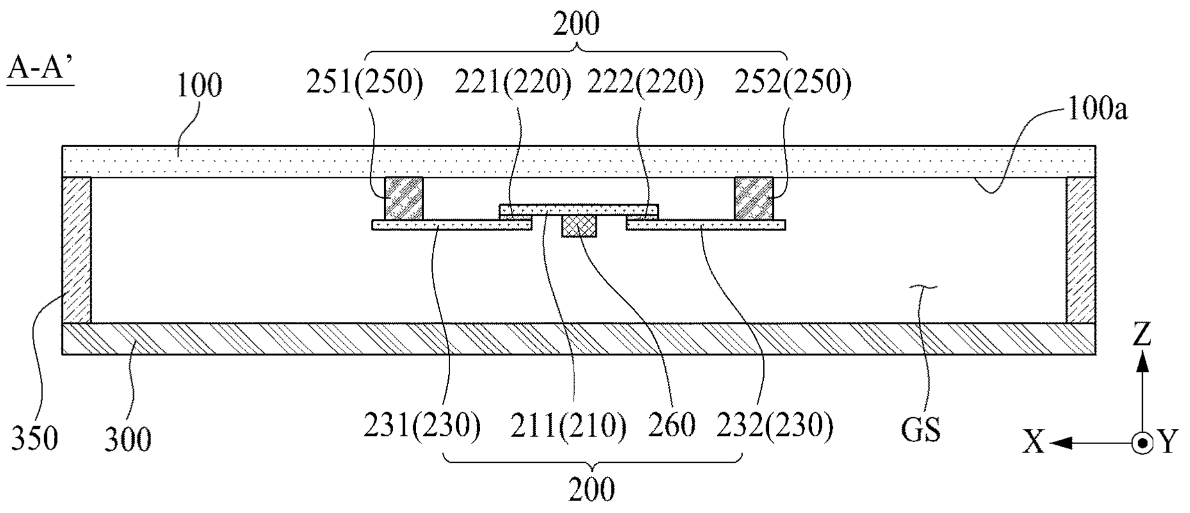
FIG. 7 is another cross-sectional view taken along line A-A' illustrated in FIG. 1 according to an embodiment of the present disclosure.

FIG. 7 is another cross-sectional view taken along line I-I' illustrated in FIG. 1. FIG. 7 illustrates an embodiment where a mass member is additionally provided in the apparatus or the vibration apparatus according to an embodiment of the present disclosure described above with reference to FIGS. 1 to 6B. For example, the mass member can act as a tuned mass damper. Therefore, in descriptions of FIG. 7, the other elements except a mass member and relevant elements are referred to by like reference numerals, and their repetitive descriptions can be omitted.

With reference to FIG. 7, an apparatus or a vibration apparatus 200 according to another embodiment of the present disclosure can further include a mass member 260 (e.g., which can act as a tuned mass damper).

The mass member 260 can be disposed or attached at the first vibration portion 210. For example, the mass member 260 can be disposed at the first active vibration member 211 between the 2-1$^{st}$ active vibration member 231 and the 2-2$^{nd}$ active vibration member 232. For example, the mass member 260 can be disposed or attached at a rear center portion or a front center portion of the first active vibration device 211. For example, the mass member 260 can have a polygonal pillar shape or a circular pillar shape.

The mass member 260 can include an elastic material capable of acting as a mass (or mass body) on the first active vibration member 211. For example, the mass member 260 can include an elastic material having strength which is less than a bending strength of the active vibration member 211. For example, the mass member 260 can include the same elastic material as a connection portion 250.

The mass member 260 can act as a mass (or mass body) which increases a mass (or weight) of each of the active vibration member 211, the 2-1$^{st}$ active vibration member 231, and the 2-2$^{nd}$ active vibration member 232 to decrease a lowest resonance frequency (or lowest natural frequency) of the active vibration member 211. Accordingly, each of the active vibration member 211, the 2-1$^{st}$ active vibration member 231, and the 2-2$^{nd}$ active vibration member 232 can further decrease a lowest resonance frequency (or lowest natural frequency), and thus, can vibrate at a relatively lower frequency (e.g., further improving the bass response).

Alternatively, the mass member 260 can be disposed between each of the 2-1$^{st}$ active vibration member 231 and the 2-2$^{nd}$ active vibration member 232 and the first active vibration member 211 (e.g., a plurality of tuned mass dampers). For example, the mass member 260 can be disposed between the first active vibration member 211 and the adhesive member 220. For example, the mass member 260 can be disposed between each of the 2-1$^{st}$ active vibration member 231 and the 2-2$^{nd}$ active vibration member 232 and the adhesive member 220. The mass member 260 can be embedded in each of first and second adhesive members 221 and 222. The first and second adhesive members 221 and 222 can be disposed to wholly surround the mass member 260. Even in this situation, the mass member 260 can act as a mass (or mass body) which increases a mass (or weight) of each of the active vibration member 211, the 2-1$^{st}$ active vibration member 231, and the 2-2$^{nd}$ active vibration member 232 to decrease a lowest resonance frequency (or lowest natural frequency) of the active vibration member 211.

Alternatively, the mass member 260 can be disposed at each of the 2-1$^{st}$ active vibration member 231 and the 2-2$^{nd}$ active vibration member 232. For example, the mass member 260 can be disposed or attached at the rear center portion of each of the 2-1$^{st}$ active vibration member 231 and the 2-2$^{nd}$ active vibration member 232 facing a supporting member 300. Even in this situation, the mass member 260 can act as a mass (or mass body) which increases a mass (or weight) of each of the active vibration member 211, the 2-1$^{st}$ active vibration member 231, and the 2-2$^{nd}$ active vibration member 232 to decrease a lowest resonance frequency (or lowest natural frequency) of the active vibration member 211.

As described above, the apparatus or the vibration apparatus 200 according to another embodiment of the present disclosure can further include the mass member 260 capable of decreasing a lowest resonance frequency of each of the active vibration member 211, the 2-1$^{st}$ active vibration member 231, and the 2-2$^{nd}$ active vibration member 232, and thus, can even further enhance a sound characteristic and a sound pressure level characteristic of a low-pitched sound band generated based on a vibration of the passive vibration member 100.

Figure 8:
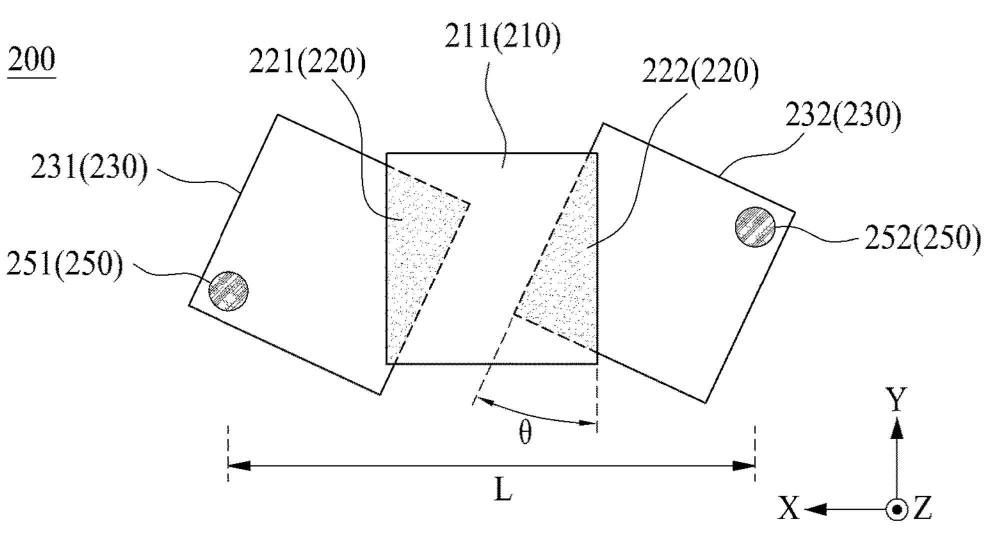
FIG. 8 illustrates a vibration apparatus according to another embodiment of the present disclosure.

FIG. 8 illustrates a vibration apparatus according to a second embodiment of the present disclosure. FIG. 8 illustrates an embodiment implemented by modifying the second vibration portion in the apparatus described above with reference to FIGS. 2 and 3. Therefore, in descriptions of FIG. 8, the other elements except the second vibration portion and relevant elements are referred to by like reference numerals, and their repetitive descriptions can be omitted.

With reference to FIGS. 2 and 8, in the vibration apparatus 200 according to a second embodiment of the present disclosure, each of the 2-1$^{st}$ and 2-2$^{nd}$ active vibration members 231 and 232 of the second vibration portion 230 can be inclined from the first active vibration member 211 of the first vibration portion 210. The 2-1$^{st}$ and 2-2$^{nd}$ active vibration members 231 and 232 can be disposed to be tilted or sloped or inclined or offset with respect to the first and second periphery portions of the first active vibration member 211 and can be arranged in parallel with the center portion of the first active vibration member 211 therebetween.

Each of the 2-1$^{st}$ and 2-2$^{nd}$ active vibration members 231 and 232 can be disposed to be tilted or sloped or inclined by a certain angle (θ) with respect to the second direction Y. Each of the 2-1$^{st}$ and 2-2$^{nd}$ active vibration members 231 and 232 can be disposed to be sloped or inclined by the certain angle (θ) with respect to first and second sides of the first active vibration member 211 parallel with the second direction Y. For example, a first side, corresponding to the first periphery portion, of each of the 2-1$^{st}$ and 2-2$^{nd}$ active vibration members 231 and 232 can be sloped or inclined by the certain angle (θ) with respect to the first and second sides of the first active vibration member 211.

According to an embodiment of the present disclosure, an angle (θ) between the first side of the first active vibration member 211 and the first side of the 2-1$^{st}$ active vibration member 231 can be an acute angle. In addition, an angle (θ) between the second side of the first active vibration member 211 and the first side of the 2-2$^{nd}$ active vibration member 232 can be an acute angle. For example, each of an angle (θ) between the first side of the first active vibration member 211 and the first side of the 2-1$^{st}$ active vibration member 231 and an angle (θ) between the second side of the first active vibration member 211 and the first side of the 2-2$^{nd}$ active vibration member 232 can be 45 degrees or less, but embodiments of the present disclosure are not limited thereto. For example, the offset arrangement can adjust or lower the stiffness of the combined structure and can also relieve pressure points.

According to an embodiment of the present disclosure, at least one or more of both corner portions of the first periphery portion of the first active vibration member 211 can overlap or be connected to the first periphery portion of the 2-1$^{st}$ active vibration member 231. At least one or more of both corner portions of the second periphery portion of the first active vibration member 211 can overlap or be connected to the first periphery portion of the 2-2$^{nd}$ active vibration member 232. Therefore, when the first active vibration member 211 is vibrating, the occurrence of a crack or breakage in a corner portion of the first active vibration member 211 can be prevented or minimized, and thus, the reliability of the first active vibration member 211 or the vibration apparatus 200 can be enhanced.

According to an embodiment of the present disclosure, each of the 2-1$^{st}$ active vibration member 231 and the 2-2$^{nd}$ active vibration member 232 can include a first corner portion overlapping the first active vibration member 211 and a second corner portion opposite to the first corner portion. Therefore, a distance between the second corner portion of each of the 2-1$^{st}$ active vibration member 231 and the 2-2$^{nd}$ active vibration member 232 and the center portion of the first active vibration member 211 can increase compared to FIG. 3, and thus, a length of the vibration apparatus 200 can increase, whereby a vibration width (or a displacement width) of the vibration apparatus 200 can increase.

In the vibration apparatus 200 according to the second embodiment of the present disclosure, the first connection member 251 of the connection portion 250 can be connected to or coupled to a region between the second corner portion of the 2-1$^{st}$ active vibration member 231 and the rear surface 100*a* of the passive vibration member 100. The second connection member 252 of the connection portion 250 can be connected to or coupled to a region between the second corner portion of the 2-2$^{nd}$ active vibration member 232 and the rear surface 100*a* of the passive vibration member 100. Therefore, a distance L between the first connection member 251 and the second connection member 252 can increase compared to FIG. 3, and thus, a length of the vibration apparatus 200 can increase, whereby a vibration width (or a displacement width) of the vibration apparatus 200 can increase.

As described above, in the vibration apparatus 200 according to the second embodiment of the present disclosure, each of the 2-1$^{st}$ and 2-2$^{nd}$ active vibration members 231 and 232 can be disposed to be sloped or inclined from the first active vibration member 211, and thus, a vibration width (or a displacement width) of the vibration apparatus 200 can increase, thereby enhancing a sound characteristic and/or a sound pressure level characteristic of the low-pitched sound band generated based on a vibration of the passive vibration member 100. For example, the 2-1$^{st}$ and 2-2$^{nd}$ active vibration members 231 and 232 can be tilted or shifted relative to the first active vibration member 211.

Figure 9:
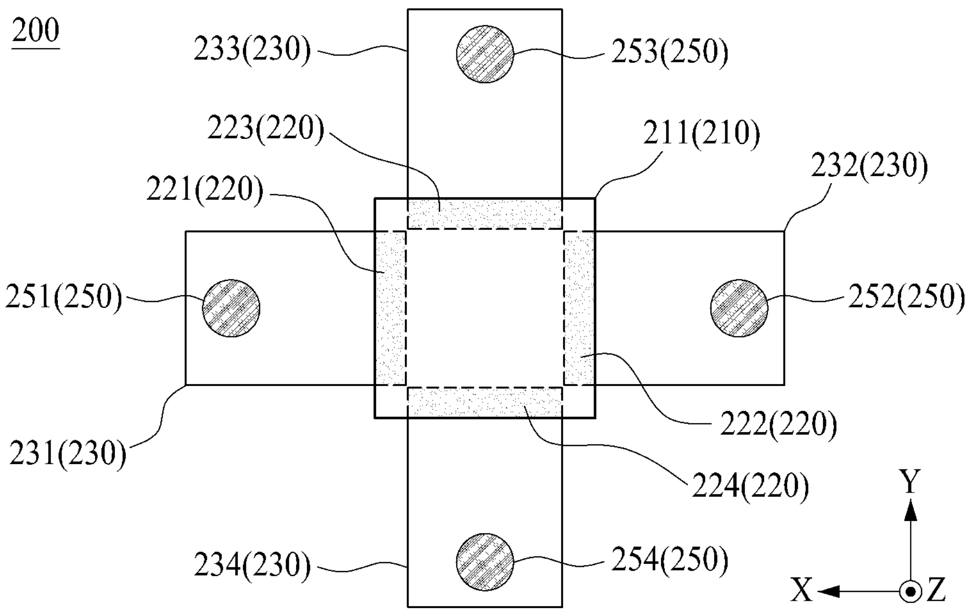
FIG. 9 illustrates a vibration apparatus according to another embodiment of the present disclosure.

FIG. 9 illustrates a vibration apparatus according to a third embodiment of the present disclosure. FIG. 9 illustrates an embodiment implemented by modifying the second vibration portion in the apparatus described above with reference to FIGS. 2 and 3 or 7. Therefore, in descriptions of FIG. 9, the other elements except the second vibration portion and relevant elements are referred to by like reference numerals, and their repetitive descriptions can be omitted.

With reference to FIGS. 2, 7, and 9, in the vibration apparatus 200 according to the third embodiment of the present disclosure, a second vibration portion 230 can include four active vibration members 231, 232, 233, and 234. For example, the second vibration portion 230 can include 2-1$^{st}$ to 2-4$^{th}$ active vibration members 231, 232, 233, and 234. For example, the 2-1$^{st}$ active vibration member 231 and the 2-2$^{nd}$ active vibration member 232 can be a pair of second active vibration members, and the 2-3$^{rd}$ active vibration member 233 and the 2-4$^{th}$ active vibration member 234 can be a pair of third active vibration members. In the present disclosure, the 2-1$^{st}$ to 2-4$^{th}$ active vibration members 231, 232, 233, and 234 can be second to fifth active vibration members, but embodiments of the present disclosure are not limited to digits "2-1$^{st}$" to "2-4$^{th}$".

Each of the 2-1$^{st}$ to 2-4$^{th}$ active vibration members 231, 232, 233, and 234 can have a shape which differs from that of the first active vibration member 211. As an embodiment of the present disclosure, each of the 2-1$^{st}$ to 2-4$^{th}$ active vibration members 231, 232, 233, and 234 can have a square shape having a small size which is the same as that of the first active vibration member 211. As another embodiment of the present disclosure, each of the 2-1$^{st}$ to 2-4$^{th}$ active vibration members 231, 232, 233, and 234 can have a rectangular shape having a smaller width which is than that of the first active vibration member 211 and a size which is greater than or equal to that of the first active vibration member 211. For example, the 2-1$^{st}$ to 2-4$^{th}$ active vibration members 231, 232, 233, and 234 can be arranged around the first active vibration member 211 similar to a trampoline type of shape or similar to spokes around a center of a wheel, which can further improve vibration characteristics and extend the lifespan of the device.

The 2-1$^{st}$ active vibration member 231 can be connected or coupled to the first periphery portion of the first active vibration member 211. The 2-1$^{st}$ active vibration member 231 can be substantially the same as the 2-1$^{st}$ active vibration member 231 described above with reference to FIGS. 2 and 3, and thus, the repetitive description thereof can be omitted.

The 2-2$^{nd}$ active vibration member 232 can be connected or coupled to the second periphery portion of the first active vibration member 211. The 2-2$^{nd}$ active vibration member 232 can be substantially the same as the 2-2$^{nd}$ active vibration member 232 described above with reference to FIGS. 2 and 3, and thus, the repetitive description thereof can be omitted.

The 2-3$^{rd}$ active vibration member 233 can be connected or coupled to a third periphery portion of the first active vibration member 211. For example, in the first active vibration member 211, the third periphery portion can be disposed (or located) between the first periphery portion and the second periphery portion, or the third periphery portion of the first active vibration member 211 can be disposed (or located) between the 2-1$^{st}$ active vibration member 231 and the 2-2$^{nd}$ active vibration member 232. For example, the third periphery portion of the first active vibration member 211 can include a side, which is parallel with a first direction X, of sides of the first active vibration member 211. For example, a first periphery portion of the 2-3$^{rd}$ active vibration member 233 can be connected or coupled to the third periphery portion of the first active vibration member 211 by a third adhesive member 223 of an adhesive member 220. Except for that the 2-3$^{rd}$ active vibration member 233 is connected to the third periphery portion of the first active vibration member 211 by the third adhesive member 223, the 2-3$^{rd}$ active vibration member 233 can be substantially the same as the 2-1$^{st}$ active vibration member 231 described above with reference to FIGS. 2 and 3, and thus, the repetitive description thereof can be omitted.

The 2-4$^{th}$ active vibration member 234 can be connected or coupled to a fourth periphery portion of the first active vibration member 211. For example, in the first active vibration member 211, the fourth periphery portion can be parallel with the third periphery portion. For example, a first periphery portion of the 2-4$^{th}$ active vibration member 234 can be connected or coupled to the fourth periphery portion of the first active vibration member 211 by a fourth adhesive member 224 of the adhesive member 220. Except for that the 2-4$^{th}$, active vibration member 234 is connected to the fourth periphery portion of the first active vibration member 211 by the fourth adhesive member 224, the 2-4$^{th}$ active vibration member 234 can be substantially the same as the 2-1$^{st}$ active vibration member 231 described above with reference to FIGS. 2 and 3, and thus, the repetitive description thereof can be omitted.

The 2-3$^{rd}$ active vibration member 233 and the 2-4$^{th}$ active vibration member 234 can be arranged in parallel with the center portion of the first active vibration member 211 therebetween. Each of the 2-3$^{rd}$ active vibration member 233 and the 2-4$^{th}$, active vibration member 234 can include a vibration device. The vibration device of each of the 2-3$^{rd}$ active vibration member 233 and the 2-4$^{th}$ active vibration member 234 can be substantially the same as the vibration device of the 2-1$^{st}$ active vibration member 231 described above with reference to FIGS. 2 to 5B, and thus, their repetitive descriptions can be omitted.

According to an embodiment of the present disclosure, each of the 2-1$^{st}$ to 2-4$^{th}$, active vibration members 231, 232, 233, and 234 can vibrate (or displace) based on the second driving signal having a phase which is the same as or opposite to that of the first driving signal applied to the first active vibration member 211.

According to another embodiment of the present disclosure, 2-1$^{st}$ to 2-4$^{th}$ driving signals respectively applied to the 2-1$^{st}$ to 2-4$^{th}$ active vibration members 231, 232, 233, and 234 can be the same or differ. For example, at least one or more of the 2-1$^{st}$ to 2-4$^{th}$, driving signals can be differ. For example, at least one or more of the 2-1$^{st}$ to 2-4$^{th}$, driving signals can include different phases. For example, at least one or more of the 2-1$^{st}$ to 2-4$^{th}$ driving signals can include different amplitudes. For example, at least one or more of the 2-1$^{st}$ to 2-4$^{th}$, driving signals can include different phases and different amplitudes. Therefore, one or more of the 2-1$^{st}$ to 2-4$^{th}$ active vibration members 231, 232, 233, and 234 can vibrate based on different vibration widths (or displacements), and thus, a vibration width of a vibration and a displacement force transferred to the passive vibration member 100 can be changed based on a vibration of the vibration apparatus 200, thereby implementing sounds of various-pitched sound bands.

Each of the third adhesive member 223 and the fourth adhesive member 224 can be substantially the same as the first adhesive member 221 described above with reference to FIGS. 2 and 3, and thus, their repetitive descriptions can be omitted.

In the vibration apparatus 200 according to the third embodiment of the present disclosure, the connection portion 250 can include first to fourth connection members 251, 252, 253, and 254.

The first connection member 251 can be connected or coupled between a second periphery portion of the 2-1$^{st}$ active vibration member 231 and the rear surface 100*a* of the passive vibration member 100. The first connection member 251 can be substantially the same as the first connection member 251 described above with reference to FIGS. 2 and 3, and thus, the repetitive description thereof can be omitted.

The second connection member 252 can be connected or coupled between a second periphery portion of the 2-2$^{nd}$ active vibration member 232 and the rear surface 100*a* of the passive vibration member 100. The second connection member 252 can be substantially the same as the second connection member 252 described above with reference to FIGS. 2 and 3, and thus, the repetitive description thereof can be omitted.

The third connection member 253 can be connected or coupled between a third periphery portion of the 2-3$^{rd}$ active vibration member 233 and the rear surface 100*a* of the passive vibration member 100. The third connection member 253 can be substantially the same as the first connection member 251 described above with reference to FIGS. 2 and 3, and thus, the repetitive description thereof can be omitted.

The fourth connection member 254 can be connected or coupled between a fourth periphery portion of the 2-4$^{th}$ active vibration member 234 and the rear surface 100*a* of the passive vibration member 100. The fourth connection member 254 can be substantially the same as the first connection member 251 described above with reference to FIGS. 2 and 3, and thus, the repetitive description thereof can be omitted.

As described above, because a vibration apparatus 200 according to a third embodiment of the present disclosure include the 2-1$^{st}$ to 2-4$^{th}$ active vibration members 231, 232, 233, and 234 connected between the first active vibration member 211 and the passive vibration member 100, the vibration apparatus 200 can further increase a vibration width (or a displacement width) of the passive vibration member 100 to further enhance a sound characteristic and a sound pressure level characteristic of the low-pitched sound band and can change a vibration width of a vibration and a displacement force transferred to the passive vibration member 100 to implement sounds of various-pitched sound bands, thereby implementing a sound characteristic and a sound pressure level characteristic of various-pitched sound bands.

Figure 10:
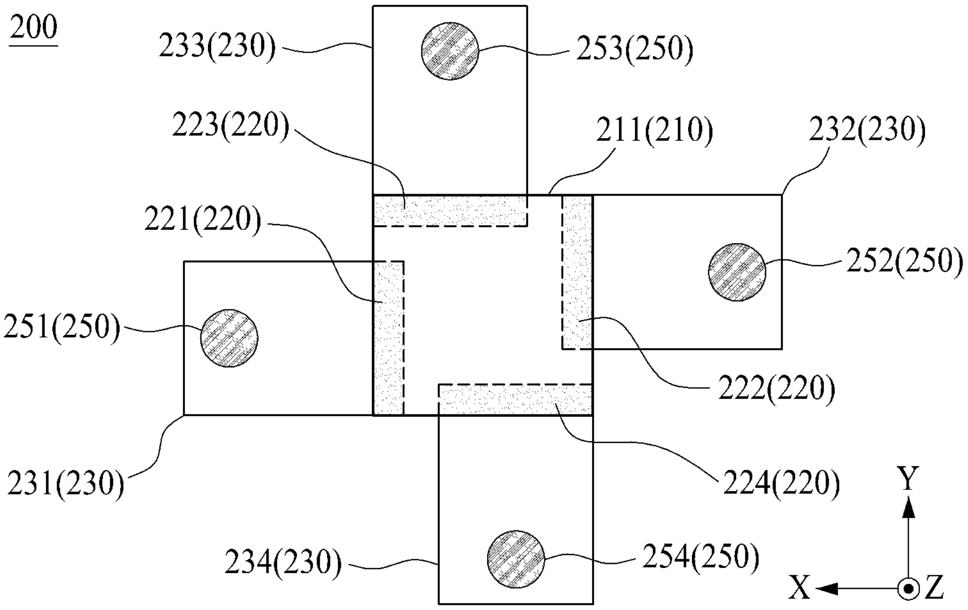
FIG. 10 illustrates a vibration apparatus according to another embodiment of the present disclosure.

FIG. 10 illustrates a vibration apparatus according to a fourth embodiment of the present disclosure. FIG. 10 illustrates an embodiment implemented by modifying an arrangement structure of the 2-1$^{st}$ to 2-4$^{th}$ active vibration members in the vibration apparatus illustrated in FIG. 9. Therefore, in descriptions of FIG. 10, the other elements except the 2-1$^{st}$ to 2-4$^{th}$ active vibration members and relevant elements are referred to by like reference numerals, and their repetitive descriptions can be omitted.

With reference to FIGS. 2, 7, and 10, in the vibration apparatus 200 according to the fourth embodiment of the present disclosure, each of the 2-1$^{st}$ to 2-4$^{th}$ active vibration members 231, 232, 233, and 234 can be disposed at a corner portion of a periphery portion of the first active vibration member 211.

Each of the 2-1$^{st}$ to 2-4$^{th}$ active vibration members 231, 232, 233, and 234 can be disposed close to a corner portion of the first active vibration member 211 with respect to a periphery portion of the first active vibration member 211.

The 2-1$^{st}$ active vibration member 231 can be connected or coupled to a first periphery portion of the first active vibration member 211 to overlap a first corner portion of the first active vibration member 211. The 2-2$^{nd}$ active vibration member 232 can be connected or coupled to a second periphery portion of the first active vibration member 211 to overlap a second corner portion, disposed in a diagonal direction with respect to the first corner portion, of the first active vibration member 211. The 2-3$^{rd}$ active vibration member 233 can be connected or coupled to a third periphery portion of the first active vibration member 211 to overlap a third corner portion of the first active vibration member 211. The 2-4$^{th}$, active vibration member 234 can be connected or coupled to a fourth periphery portion of the first active vibration member 211 to overlap a fourth corner portion, disposed in a diagonal direction with respect to the third corner portion, of the first active vibration member 211.

According to an embodiment of the present disclosure, the 2-1$^{st}$ to 2-4$^{th}$ active vibration members 231 to 234 can respectively overlap the first to fourth corner portions of the first active vibration member 211, and thus, when the first active vibration member 211 is vibrating, the occurrence of a crack or breakage in the corner portion of the first active vibration member 211 can be prevented or minimized, and thus, the reliability of the first active vibration member 211 or the vibration apparatus 200 can be enhanced.

As described above, the vibration apparatus 200 according to the fourth embodiment of the present disclosure can have the same effect as that of the vibration apparatus 200 according to the third embodiment of the present disclosure and each of the 2-1$^{st}$ to 2-4$^{th}$, active vibration members 231 to 234 can respectively overlap the corner portion of the first active vibration member 211, and thus, the occurrence of a crack or breakage in the corner portion of the first active vibration member 211 can be prevented or minimized, thereby enhancing reliability (e.g., pressure points can be relieved).

Figure 11:
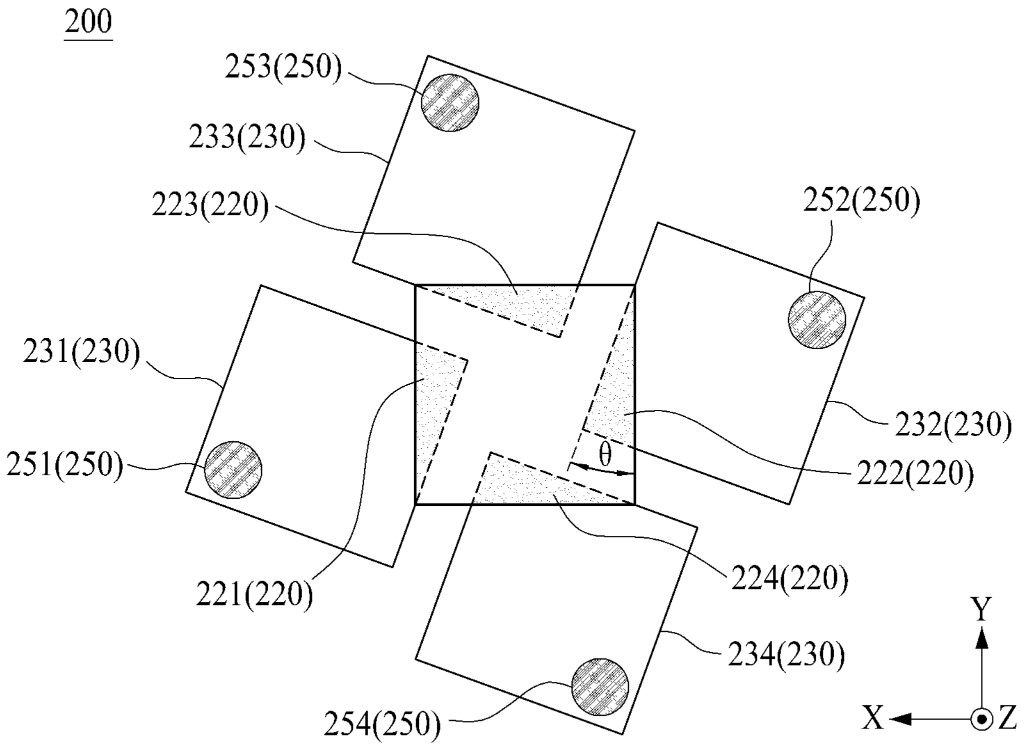
FIG. 11 illustrates a vibration apparatus according to another embodiment of the present disclosure.

FIG. 11 illustrates a vibration apparatus according to a fifth embodiment of the present disclosure. FIG. 11 illustrates an embodiment where 2-3$^{rd}$ and 2-4$^{th}$ active vibration members are additionally provided in the second vibration portion of the vibration apparatus described above with reference to FIG. 8. Therefore, in descriptions of FIG. 11, the other elements except the 2-3$^{rd}$ and 2-4$^{th}$ active vibration members and relevant elements are referred to by like reference numerals, and their repetitive descriptions can be omitted.

With reference to FIGS. 2, 7, and 11, in the vibration apparatus 200 according to the fifth embodiment of the present disclosure, the second vibration portion 230 can further include 2-3$^{rd}$ and 2-4$^{th}$ active vibration members 233 and 234.

Each of the 2-3$^{rd}$ and 2-4$^{th}$ active vibration members 233 and 234 can be disposed to be sloped or inclined with respect to third and fourth periphery portions of the first active vibration member 211 and can be arranged in parallel with the center portion of the first active vibration member 211 therebetween. Each of the 2-3$^{rd}$ and 2-4$^{th}$ active vibration members 233 and 234 can be configured to have the same shape and the same size as each of the 2-1$^{st}$ and 2-2$^{nd}$ active vibration members 231 and 232.

Each of the 2-3$^{rd}$ and 2-4$^{th}$ active vibration members 233 and 234 can be disposed to be sloped or inclined by a certain angle (θ) with respect to a first direction X. For example, each of the 2-3$^{rd}$ and 2-4$^{th}$ active vibration members 233 and 234 can be disposed to be sloped or inclined by the certain angle (θ) with respect to third and fourth sides of the first active vibration member 211 parallel with the first direction X. For example, a first side, corresponding to the first periphery portion, of each of the 2-3$^{rd}$ and 2-4$^{th}$, active vibration members 233 and 234 can be sloped or inclined by the certain angle (θ) with respect to the third and fourth sides of the first active vibration member 211. For example, the 2-1$^{st}$ to 2-4$^{th}$ active vibration members 231 to 234 can be disposed around the first active vibration member 211 in a type of pinwheel arrangement.

According to an embodiment of the present disclosure, an angle (θ) between each of sides of the first active vibration member 211 and the first side of the 2-1$^{st}$ to 2-4$^{th}$ active vibration member 231, 232, 233, and 234 can be an acute angle. For example, an angle (θ) between each of sides of the first active vibration member 211 and the first side of the 2-1$^{st}$ to 2-4$^{th}$ active vibration member 231, 232, 233, and 234 can be 45 degrees or less.

According to an embodiment of the present disclosure, each of the 2-1$^{st}$ to 2-4$^{th}$ active vibration member 231, 232, 233, and 234 can include a first corner portion overlapping the first active vibration member 211 and a second corner portion opposite to the first corner portion. Therefore, a distance between the second corner portion of each of the 2-1$^{st}$ to 2-4$^{th}$ active vibration member 231, 232, 233, and 234 and the center portion of the first active vibration member 211 can increase compared to FIG. 3, and thus, a length of the vibration apparatus 200 can increase, whereby a vibration width (or a displacement width) of the vibration apparatus 200 can increase.

According to an embodiment of the present disclosure, the 2-3$^{rd}$ active vibration member 233 can be connected or coupled to the third periphery portion of the first active vibration member 211 by a third adhesive member 223 of an adhesive member 220. For example, a first periphery portion, including a first corner portion, of the 2-3$^{rd}$ active vibration member 233 can be connected or coupled to the third periphery portion of the first active vibration member 211 by the third adhesive member 223. Except for that the 2-3$^{rd}$ active vibration member 233 is connected to the third periphery portion of the first active vibration member 211 by the third adhesive member 233, the 2-3$^{rd}$ active vibration member 233 can be substantially the same as the 2-1$^{st}$ active vibration member 231 described above with reference to FIG. 8, and thus, the repetitive description thereof can be omitted.

The 2-4$^{th}$ active vibration member 234 can be connected or coupled to the fourth periphery portion of the first active vibration member 211 by a fourth adhesive member 224 of the adhesive member 220. For example, a first periphery portion, including a first corner portion, of the 2-4$^{th}$ active vibration member 234 can be connected or coupled to the fourth periphery portion of the first active vibration member 211 by the fourth adhesive member 224. Except for that the 2-4$^{th}$ active vibration member 234 is connected to the fourth periphery portion of the first active vibration member 211 by the fourth adhesive member 234, the 2-4$^{th}$ active vibration member 234 can be substantially the same as the 2-1$^{st}$ active vibration member 231 described above with reference to FIG. 8, and thus, the repetitive description thereof can be omitted.

According to an embodiment of the present disclosure, at least one or more of both corner portions of the third periphery portion of the first active vibration member 211 can overlap or be connected to the first periphery portion of the 2-3$^{rd}$ active vibration member 233.

At least one or more of both corner portions of the fourth periphery portion of the first active vibration member 211 can overlap or be connected to the first periphery portion of the 2-4$^{th}$ active vibration member 234. Accordingly, each corner portions of the first active vibration member 211 can overlap or be connected to each of the 2-1$^{st}$ to 2-4$^{th}$ active vibration members 231, 232, 233, and 234. Therefore, when the first active vibration member 211 is vibrating, the occurrence of a crack or breakage in corner portions of the first active vibration member 211 can be prevented or minimized, and thus, the reliability of the first active vibration member 211 or the vibration apparatus 200 can be enhanced.

Each of the 2-3$^{rd}$ active vibration member 233 and the 2-4$^{th}$ active vibration member 234 can include a vibration device. The vibration device of each of the 2-3$^{rd}$ active vibration member 233 and the 2-4$^{th}$ active vibration member 234 can be substantially the same as the vibration device of the 2-1$^{st}$ active vibration member 231 described above with reference to FIGS. 2 to 5B, and thus, their repetitive descriptions can be omitted.

According to an embodiment of the present disclosure, each of the 2-1$^{st}$ to 2-4$^{th}$ active vibration members 231, 232, 233, and 234 can vibrate (or displace) based on the second driving signal having a phase which is the same as or opposite to that of the first driving signal applied to the first active vibration member 211.

According to another embodiment of the present disclosure, as described above with reference to FIG. 9, 2-1$^{st}$ to 2-4$^{th}$ driving signals respectively applied to the 2-1$^{st}$ to 2-4$^{th}$ active vibration members 231, 232, 233, and 234 can be the same or differ.

In the vibration apparatus 200 according to the fifth embodiment of the present disclosure, the first connection member 251 of the connection portion 250 can be connected or coupled between a second corner portion of the 2-1$^{st}$ active vibration member 231 and the rear surface 100*a* of the passive vibration member 100. The second connection member 252 of the connection portion 250 can be connected or coupled between a second corner portion of the 2-2$^{nd}$ active vibration member 232 and the rear surface 100*a* of the passive vibration member 100. Therefore, a distance between the first connection member 251 and the second connection member 252 can increase compared to FIG. 3, and thus, a length of the vibration apparatus 200 can increase, whereby a vibration width (or a displacement width) of the vibration apparatus 200 can increase.

In the vibration apparatus 200 according to the fifth embodiment of the present disclosure, the connection portion 250 can further include third and fourth connection members 253 and 254.

The third connection member 253 can be connected or coupled between a second corner portion of the 2-3$^{rd}$ active vibration member 233 and the rear surface 100*a* of the passive vibration member 100. The fourth connection member 253 can be connected or coupled between a second corner portion of the 2-4$^{th}$ active vibration member 234 and the rear surface 100*a* of the passive vibration member 100. Therefore, a distance between the third connection member 253 and the fourth connection member 254 can increase compared to FIG. 3, and thus, a length of the vibration apparatus 200 can increase, whereby a vibration width (or a displacement width) of the vibration apparatus 200 can increase.

As described above, the vibration apparatus 200 according to fifth embodiment of the present disclosure can further include the 2-1$^{st}$ to 2-4$^{th}$ active vibration members 231, 232, 233, and 234, and thus, can have the same effect as that of the vibration apparatus 200 according to fourth embodiment of the present disclosure. In addition, in the vibration apparatus 200 according to fifth embodiment of the present disclosure, each of the 2-1$^{st}$ to 2-4$^{th}$ active vibration members 231, 232, 233, and 234 can be disposed to be sloped or inclined from the first active vibration member 211, and thus, a vibration width (or a displacement width) of the vibration apparatus 200 can increase, thereby enhancing a sound characteristic and/or a sound pressure level characteristic of the low-pitched sound band generated based on a vibration of the passive vibration member 100 (e.g., the bass response can be further improved).

Figure 12:
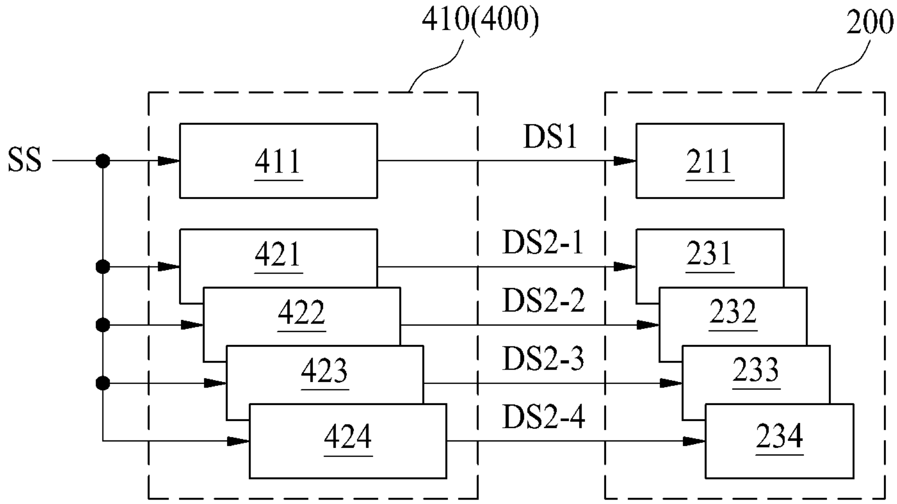
FIG. 12 is a block diagram illustrating a vibration driving circuit according to an embodiment of the present disclosure.

FIG. 12 is a block diagram illustrating a vibration driving circuit according to a first embodiment of the present disclosure.

With reference to FIGS. 2 and 12, the vibration driving circuit 400 according to the first embodiment of the present disclosure can generate a first driving signal DS1 and a plurality of second driving signals DS2-1 to DS2-4 for vibrating (or displacing) each of first and second vibration portion 210 and 230 based on one sound source signal SS input from a host device (or a host driving circuit) and can supply the generated driving signals DS1 and DS2-1 to DS2-4 to corresponding vibration portion 210 and 230.

The vibration driving circuit 400 according to the first embodiment of the present disclosure can include an amplification circuit part 410.

The amplification circuit part 410 can be configured to amplify one sound source signal SS input thereto and supply the amplified sound source signal SS to each of the first active vibration member 211 and the plurality of active vibration members 231, 232, 233, and 234. The amplification circuit part 410 can include a plurality of amplification circuits 411 and 421 to 424 respectively corresponding to the first active vibration member 211 and the plurality of active vibration members 231, 232, 233, and 234. For example, the amplification circuit part 410 can include a first amplification circuit 411 and a plurality of second amplification circuits 421 to 424. For example, the vibration driving circuit 400 to drive the embodiment of the present disclosure illustrated in FIGS. 3 and 7 can include a first amplification circuit 411, a 2-1$^{st}$ amplification circuit 421, and a 2-2$^{nd}$ amplification circuit 422. For example, the vibration driving circuit 400 to drive the embodiment of the present disclosure illustrated in FIGS. 9 to 11 can include a first amplification circuit 411 and 2-1$^{st}$ to 2-4$^{th}$ amplification circuit 421, 422, 423, and 424.

Each of the first amplification circuit 411 and the plurality of second amplification circuits 421 to 424 can simultaneously receive the same sound source signal and can amplify a sound source signal based on a predetermined gain value to generate the first driving signal DS1 and the plurality of second driving signals DS2-1 to DS2-4.

The first amplification circuit 411 can amplify a sound source signal to a first driving signal DS1 having a positive polarity or a negative polarity based on a predetermined gain value to generate a first driving signal DS1 and can supply the generated first driving signal DS1 to the first active vibration member 211. For example, the first driving signal D1 of the positive polarity and the first driving signal D1 of the negative polarity can have the same period and a first amplitude. A first amplitude of each of the first driving signal DS1 of the positive polarity and the first driving signal DS1 of the negative polarity can increase or decrease based on the sound source signal. The first driving signal DS1 of negative can be a signal having an anti-phase of the first driving signal DS1 of the positive polarity.

The plurality of second amplification circuits 421 to 424 can amplify the sound source signal to be equal to or different from the first driving signal DS1 of the positive polarity or the negative polarity based on the predetermined gain value to generate a plurality of second driving signals DS2-1 to DS2-4 and can supply the generated plurality of second driving signals DS2-1 to DS2-4 to corresponding second active vibration members 231, 232, 234, and 234.

A gain value of each of the plurality of second amplification circuits 421, 422, 423, and 424 can be set to correspond to a-pitched sound band of a sound which is to be implemented in the apparatus according to an embodiment of the present disclosure.

According to an embodiment of the present disclosure, the gain value of each of the plurality of second amplification circuits 421, 422, 423, and 424 can be set so that each of the plurality of second driving signals DS2-1 to DS2-4 has the same phase as that of the first driving signal DS1. Accordingly, the plurality of second amplification circuits 421, 422, 423, and 424 can amplify the sound signal to the plurality of second driving signals DS2-1 to DS2-4 having the same phase as that of the first driving signal DS1 to output the amplified sound signal. In this situation, as described above, a sound characteristic and a sound pressure level characteristic of the low-pitched sound band generated based on a vibration of the passive vibration member 100 can be enhanced.

According to another embodiment of the present disclosure, the gain value of each of the plurality of second amplification circuits 421, 422, 423, and 424 can be set so that each of the plurality of second driving signals DS2-1 to DS2-4 has an anti-phase as that of the first driving signal DS1. Accordingly, the plurality of second amplification circuits 421, 422, 423, and 424 can amplify the sound signal to the plurality of second driving signals DS2-1 to DS2-4 having the anti-phase as that of the first driving signal DS1 to output the amplified sound signal. In this situation, as described above, a sound characteristic and a sound pressure level characteristic of the middle-low-pitched sound band and the middle-high-pitched sound band generated based on a vibration of the passive vibration member 100 can be enhanced, thus providing a wide dynamic range.

According to an embodiment of the present disclosure, the gain value of each of the plurality of second amplification circuits 421, 422, 423, and 424 can be set so that at least one or more of the plurality of second driving signals DS2-1 to DS2-4 have a phase and an amplitude which differ from at least one or more of a phase and an amplitude of the first driving signal DS1. Therefore, each of the plurality of second amplification circuits 421, 422, 423, and 424 can amplify the sound signal to the plurality of second driving signals DS2-1 to DS2-4 having a phase and an amplitude which differ from at least one or more of a phase and an amplitude of the first driving signal DS1 and can output the amplified sound signal. For example, the plurality of second driving signals DS2-1 to DS2-4 can be the same or differ. For example, at least one or more of a phase and an amplitude of each of the plurality of second driving signals DS2-1 to DS2-4 can be the same as or different from one or more of a phase and an amplitude of the first driving signal DS1. For example, each of the plurality of second driving signals DS2-1 to DS2-4 can have the same phase as that of the first driving signal DS1 and can have an amplitude which is greater or less than that of the first driving signal DS1. In this situation, as described above, sounds of various-pitched sound bands based on a vibration of the passive vibration member 100 can be implemented and a sound characteristic and a sound pressure level characteristic of various-pitched sound bands generated based on a vibration of the passive vibration member 100 can be enhanced.

Figure 13:
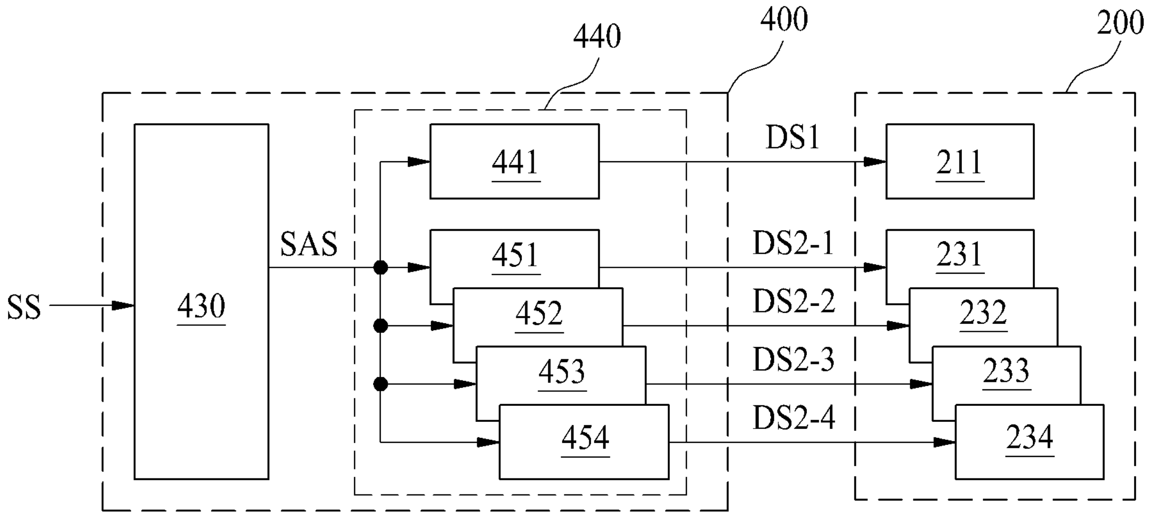
FIG. 13 is a block diagram illustrating a vibration driving circuit according to another embodiment of the present disclosure.

FIG. 13 is a block diagram illustrating a vibration driving circuit according to a second embodiment of the present disclosure.

With reference to FIGS. 2 and 13, the vibration driving circuit 400 according to the second embodiment of the present disclosure can generate a first driving signal DS1 and a plurality of second driving signals DS2-1 to DS2-4 for vibrating (or displacing) each of first and second vibration portion 210 and 230 based on one sound source signal SS input from a host device (or a host driving circuit) and can supply the generated driving signals DS1 and DS2-1 to DS2-4 to corresponding vibration portion 210 and 230.

The vibration driving circuit 400 according to the second embodiment of the present disclosure can include an amplification circuit 430 and a signal conversion part 440.

The amplification circuit 430 can simultaneously receive the same sound source signal and can amplify the sound source signal based on a predetermined gain value to generate a sound source amplification signal SAS. For example, the amplification circuit 430 can include a preamplifier and a main amplifier. A sound source signal (or a sound signal) SS input to the vibration driving circuit 400 can be primarily amplified by the preamplifier, and a signal primarily amplified by the preamplifier can be additionally amplified by the main amplifier and can be output as the sound source amplification signal SAS.

The signal conversion part 440 can convert the sound source amplification signal SAS supplied from the amplification circuit 430 into a driving signal DS1 and DS2-1 to DS2-4 and can supply the driving signals DS1 and DS2-1 to DS2-4 to corresponding active vibration members 211, 231, 232, 233, and 234. For example, the signal conversion part

440 can convert the sound source amplification signal SAS, supplied from the amplification circuit 430, into a driving signal DS based on a predetermined signal conversion coefficient (or a gain value) and can supply the driving signals DS1 and DS2-1 to DS2-4 to corresponding active vibration members 211, 231, 232, 233, and 234.

The signal conversion part 440 according to an embodiment of the present can include a plurality of signal conversion circuits 441 and 451 to 454 respectively corresponding to the first active vibration member 211 and the plurality of second active vibration members 231, 232, 233, and 234. For example, the signal conversion part 440 can include a first signal conversion circuit 441 and a plurality of second signal conversion circuits 451 to 454. For example, the vibration driving circuit 400 to drive the embodiment of the present disclosure illustrated in FIGS. 3 and 7 can include a first signal conversion circuit 441, a 2-$1^{st}$ signal conversion circuit 451, and a 2-$2^{nd}$ signal conversion circuit 452. For example, the vibration driving circuit 400 to drive the embodiment of the present disclosure illustrated in FIGS. 9 and 11 can include a first signal conversion circuit 441 and 2-$1^{st}$ to 2-$4^{th}$ signal conversion circuits 451 to 454.

The first signal conversion circuit 441 can convert the sound source amplification signal SAS, supplied from the amplification circuit 430, into the first driving signal DS1 of the positive polarity or the negative polarity based on the predetermined signal conversion coefficient (or gain value) and can supply the generated the first driving signal DS1 to the first active vibration member 211. For example, the first signal conversion circuit 441 can convert the sound source amplification signal SAS into the first driving signal DS1 of the positive polarity or the negative polarity having a first amplitude based on the predetermined signal conversion coefficient (or gain value). For example, the first driving signal D1 of the positive polarity and the first driving signal D1 of the negative polarity can have the same period and a first amplitude. A first amplitude of each of the first driving signal DS1 of the positive polarity and the first driving signal DS1 of the negative polarity can increase or decrease based on the sound source signal. The first driving signal DS1 of the negative polarity can be a signal having an anti-phase of the first driving signal DS1 of the positive polarity.

The plurality of second signal conversion circuits 451 to 454 can amplify the sound source signal to be equal to or different from the first driving signal DS1 of the positive polarity or the negative polarity based on the predetermined signal conversion coefficient (or gain value) to generate a plurality of second driving signals DS2-1 to DS2-4 and can supply the generated plurality of second driving signals DS2-1 to DS2-4 to corresponding second active vibration members 231, 232, 233, and 234.

A signal conversion coefficient (or gain value) of each of the plurality of second signal conversion circuits 451 to 454 can be set to correspond to a-pitched sound band of a sound which is to be implemented in the apparatus according to an embodiment of the present disclosure.

According to an embodiment of the present disclosure, the signal conversion coefficient (or gain value) of each of the plurality of second signal conversion circuits 451 to 454 can be set so that each of the plurality of second driving signals DS2-1 to DS2-4 has the same phase as that of the first driving signal DS1. Accordingly, the plurality of second signal conversion circuits 451 to 454 can amplify the sound signal to the plurality of second driving signals DS2-1 to DS2-4 having the same phase as that of the first driving signal DS1 to output the amplified sound signal. In this situation, as described above, a sound characteristic and a sound pressure level characteristic of the low-pitched sound band generated based on a vibration of the passive vibration member 100 can be enhanced.

According to another embodiment of the present disclosure, the signal conversion coefficient (or gain value) of each of the plurality of second signal conversion circuits 451 to 454 can be set so that each of the plurality of second driving signals DS2-1 to DS2-4 has an anti-phase as that of the first driving signal DS1. Accordingly, the plurality of second signal conversion circuits 451 to 454 can amplify the sound signal to the plurality of second driving signals DS2-1 to DS2-4 having the anti-phase as that of the first driving signal DS1 to output the amplified sound signal. In this situation, as described above, a sound characteristic and a sound pressure level characteristic of the middle-low-pitched sound band and the middle-high-pitched sound band generated based on a vibration of the passive vibration member 100 can be enhanced.

According to an embodiment of the present disclosure, the signal conversion coefficient (or gain value) of each of the plurality of second signal conversion circuits 451 to 454 can be set so that at least one or more of the plurality of second driving signals DS2-1 to DS2-4 have a phase and an amplitude which differ from at least one or more of a phase and an amplitude of the first driving signal DS1. Therefore, each of the plurality of second signal conversion circuits 451 to 454 can amplify the sound signal to the plurality of second driving signals DS2-1 to DS2-4 having a phase and an amplitude which differ from at least one or more of a phase and an amplitude of the first driving signal DS1 and can output the amplified sound signal. For example, the plurality of second driving signals DS2-1 to DS2-4 can be the same or differ. For example, at least one or more of a phase and an amplitude of each of the plurality of second driving signals DS2-1 to DS2-4 can be the same as or different from one or more of a phase and an amplitude of the first driving signal DS1. For example, each of the plurality of second driving signals DS2-1 to DS2-4 can have the same phase as that of the first driving signal DS1 and can have an amplitude which is greater or less than that of the first driving signal DS1. In this situation, as described above, sounds of various-pitched sound bands based on a vibration of the passive vibration member 100 can be implemented and a sound characteristic and a sound pressure level characteristic of various-pitched sound bands generated based on a vibration of the passive vibration member 100 can be enhanced and a wide dynamic range of sounds can be provided.

As described above, the vibration driving circuit 400 according to the second embodiment of the present disclosure can have the same effect as that of the vibration driving circuit 400 described above with reference to FIG. 12, and the number of used amplification circuits can be reduced compared to the vibration driving circuit 400 described above with reference to FIG. 12.

Figure 14:
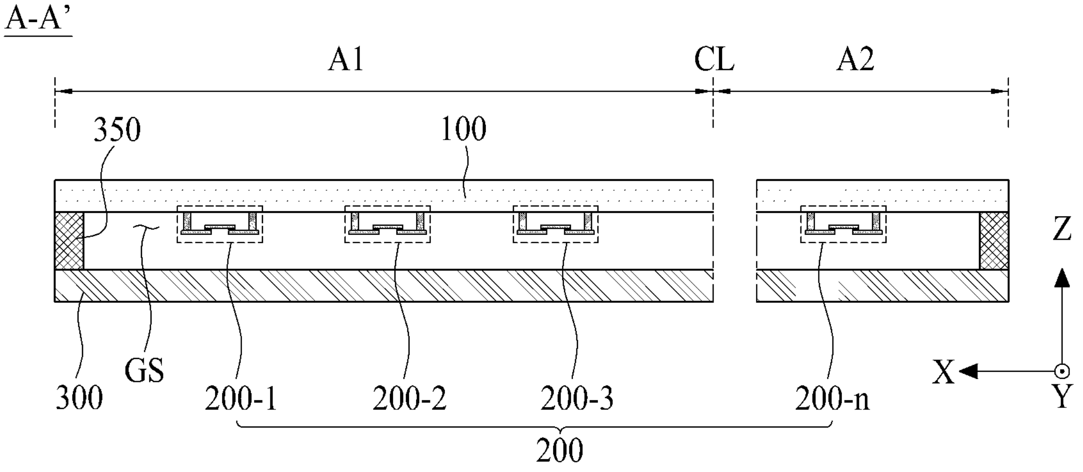
FIG. 14 is another cross-sectional view taken along line A-A' illustrated in FIG. 1 according to an embodiment of the present disclosure.

FIG. 14 is another cross-sectional view taken along line A-A' illustrated in FIG. 1. FIG. 14 illustrates an embodiment where a plurality of vibration apparatuses are configured in the apparatus described above with reference to FIGS. 1 to 13. Therefore, in the following description, the other elements except a plurality of vibration apparatuses and relevant elements are referred to by like reference numerals, and their repetitive descriptions can be omitted.

With reference to FIG. 14, an apparatus according to another embodiment of the present disclosure can include a plurality of vibration apparatuses 200-1 to 200-*n* which are connected with a passive vibration member 100.

Each of the plurality of vibration apparatuses 200-1 to **200-*n* can be configured as one of the vibration apparatus according to embodiments of the present disclosure described above with reference to FIGS. 1 to 13. For example, each of the plurality of vibration apparatuses 200-1 to 200-*n* can be configured as the same vibration apparatus or a different vibration apparatus of the vibration apparatuses 200 described above with reference to FIGS. 1 to 13. Accordingly, a repetitive description of each of the plurality of vibration apparatuses 200-1 to 200-*n*** can be omitted.

According to another embodiment of the present disclosure, the plurality of vibration apparatuses 200-1 to **200-*n* can be divided (or classified) into a first group and a second group. Each of the first group and the second group can include one or more of the plurality of vibration apparatuses 200-1 to 200-*n*. For example, one or more of the plurality of vibration apparatuses 200-1 to 200-*n* can be included in the first group, and one or more other vibration apparatuses except the one or more vibration apparatuses included in the first group among the plurality of vibration apparatuses 200-1 to 200-*n*** can be included in the second group. For example, the first group can be a first vibration group or a first driving group, and the second group can be a second vibration group or a second driving group. Also, the first group can the second group can correspond to a same sound channel (e.g., a center channel) or different sound channels (e.g., left and right channels for stereo sound, etc.).

The number of vibration apparatuses 200-1 to **200-*n* in the first group can be equal to or different from the number of vibration apparatuses 200-1 to 200-*n*** in the second group.

According to another embodiment of the present disclosure, the plurality of vibration apparatuses 200-1 to **200-*n* can be divided (or classified) into the first group and the second group based on an arrangement position. For example, with respect to an arrangement position disposed along a first direction X and/or a second direction Y, odd-numbered vibration apparatuses 200-1, 200-3, . . . of the plurality of vibration apparatuses 200-1 to 200-*n* can be included in the first group, and even-numbered vibration apparatuses 200-2, 200-4, . . . , and 200-*n* of the plurality of vibration apparatuses 200-1 to 200-*n*** can be included in the second group.

According to another embodiment of the present disclosure, with respect to a center line CL, the passive vibration member 100 can include a first region A1 and a second region A2. For example, the first region A1 can be a left region of the passive vibration member 100, and the second region A2 can be a right region of the passive vibration member 100. Accordingly, vibration apparatuses 200-1, 200-2, 200-3, . . . disposed at the first region A1 of the passive vibration member 100 among the plurality of vibration apparatuses 200-1 to **200-*n* can be included in the first group, and vibration apparatuses . . . , and 200-*n* disposed at the second region A2 of the passive vibration member 100 among the plurality of vibration apparatuses 200-1 to 200-*n*** can be included in the second group.

According to an embodiment of the present disclosure, a driving signal applied to one or more vibration apparatuses 200-1 to **200-*n* of a first group can be the same as a driving signal applied to one or more vibration apparatuses 200-1 to 200-*n* of a second group. For example, each of a plurality of second driving signals and a first driving signal applied to the one or more vibration apparatuses 200-1 to 200-*n* of the first group can have a phase (or the same phase and the same amplitude) which is the same as each of a plurality of second driving signals and a first driving signal applied to the one or more vibration apparatuses 200-1 to 200-*n* of the second group. Accordingly, as described above, a sound characteristic and a sound pressure level characteristic of the low-pitched sound band generated based on a vibration of the passive vibration member 100** can be further enhanced.

According to an embodiment of the present disclosure, each of a plurality of second driving signals applied to the one or more vibration apparatuses 200-1 to **200-*n* of each of the first group and the second group can have an opposite phase (or an anti-phase and the same amplitude) to that of a first driving signal applied to the one or more vibration apparatuses 200-1 to 200-*n* of each of the first group and the second group. Accordingly, as described above, a sound characteristic and a sound pressure level characteristic of the middle-low-pitched sound band and the middle-high-pitched sound band generated based on a vibration of the passive vibration member 100** can be further enhanced.

According to another embodiment of the present disclosure, a driving signal applied to one or more vibration apparatuses of the first group can differ from a driving signal applied to one or more vibration apparatuses of the second group. For example, at least one or more of a phase and an amplitude of each of the first driving signal and/or the plurality of second driving signals which are applied to one or more vibration apparatuses of the second group can differ from at least one or more of a phase and an amplitude of each of the first driving signal and/or the plurality of second driving signals which are applied to one or more vibration apparatuses of the first group. In this situation, as described above, sounds of various-pitched sound bands based on a vibration of the passive vibration member 100 can be implemented and a sound characteristic and a sound pressure level characteristic of various-pitched sound bands generated based on a vibration of the passive vibration member 100 can be enhanced.

Figure 15:
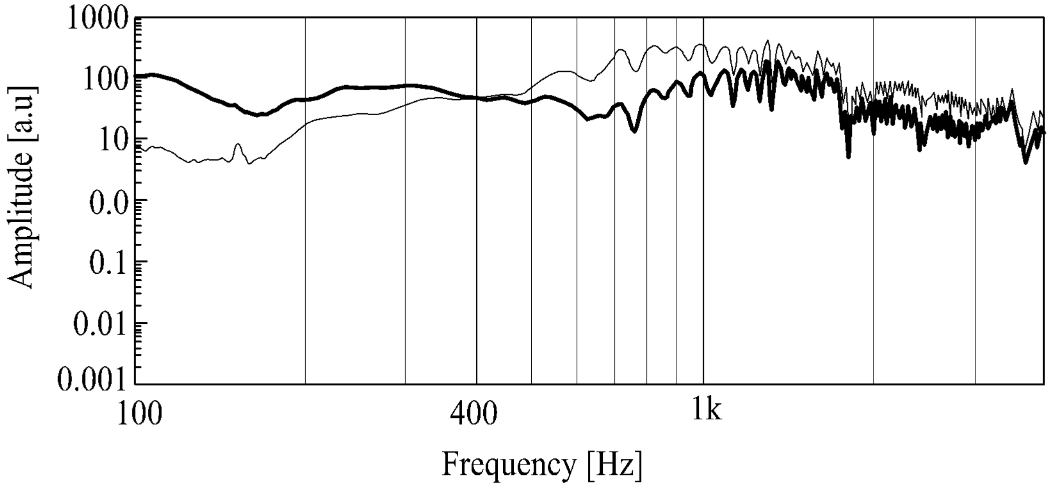
FIG. 15 is a graph illustrating a sound output characteristic of an apparatus according to an embodiment of the present disclosure.

FIG. 15 is a graph illustrating a sound output characteristic of an apparatus according to a first embodiment of the present disclosure. In FIG. 15, the abscissa axis represents a frequency (Hz), and the ordinate axis represents an amplitude. The amplitude is a digit expressed as a relative value with respect to a maximum amplitude. Also, FIG. 15 shows a log-log graph. In FIG. 15, a thick solid line represents a sound output characteristic when a second driving signal applied to each of a plurality of second active vibration members has the same phase as that of a first driving signal applied to a first active vibration member as described above with reference to FIG. 6A, and a solid line represents a sound output characteristic when the second driving signal applied to each of the plurality of second active vibration members has an opposite phase to that of the first driving signal applied to the first active vibration member as described above with reference to FIG. 6B.

As seen in FIG. 15, comparing with the solid line, in the thick solid line, it can be seen that a sound pressure level increases in 400 Hz or less. Therefore, when the second driving signal applied to each of the plurality of second active vibration members has the same phase as that of the first driving signal applied to the first active vibration member, it can be seen that a sound characteristic and a sound pressure level are enhanced in 400 Hz or less (e.g., the lower range is improved).

As seen in FIG. 15, comparing with the thick solid line, in the solid line, it can be seen that a sound pressure level increases in 400 Hz or more. Therefore, when the second driving signal applied to each of the plurality of second active vibration members has an opposite phase to that of the first driving signal applied to the first active vibration member, it can be seen that a sound characteristic and a sound pressure level are enhanced in 400 Hz or more (e.g., the higher range can be improved). Also, by applied the two different types of driving signals, it can be seen that the flatness and mid-range can be improved. Thus, the vibration apparatus can provide an improved, wide dynamic range.

A vibration apparatus according to an embodiment of the present disclosure can be applied to a vibration apparatus disposed at an apparatus. The apparatus according to an embodiment of the present disclosure can be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game apparatuses, notebook computers, monitors, cameras, camcorders, home appliances, etc. Addition, the vibration apparatus according to an embodiment of the present disclosure can be applied to organic light-emitting lighting apparatuses or inorganic light-emitting lighting apparatuses. When the vibration apparatus of an embodiment of the present disclosure is applied to lighting apparatuses, the lighting apparatus can act as lighting and a speaker. Addition, when the vibration apparatus of an embodiment of the present disclosure is applied to a mobile device, etc, the vibration apparatus can act as one or more of a speaker, a receiver, and a haptic apparatus, but embodiments of the present disclosure are not limited thereto.

An apparatus according to an embodiment of the present disclosure will be described below.

An apparatus according to an embodiment of the present disclosure can comprise a passive vibration member, a vibration apparatus connected to a rear surface of the passive vibration member, and a supporting member at the rear surface of the passive vibration member, the vibration apparatus can comprise a first vibration portion, a second vibration portion connected to a periphery of the first vibration portion, and a connection portion connected to a periphery of the second vibration portion and the rear surface of the passive vibration member.

According to some embodiments of the present disclosure, the first vibration portion can comprise a first active vibration member including first and second periphery portions which are parallel with each other, the second vibration portion can comprise a 2-1$^{st}$ active vibration member and a 2-2$^{nd}$ active vibration member respectively connected to the first and second periphery portions of the first active vibration member, and the 2-1$^{st}$ active vibration member and the 2-2$^{nd}$ active vibration member can be disposed in parallel with a center portion of the first active vibration member therebetween.

According to some embodiments of the present disclosure, each of the 2-1$^{st}$ active vibration member and the 2-2$^{nd}$ active vibration member can comprise a first periphery portion overlapping the first active vibration member, and a second periphery portion connected to the connection portion, the connection portion can comprise a first connection member connected between the second periphery portion of the 2-1$^{st}$ active vibration member and the passive vibration member, and a second connection member connected between the second periphery portion of the 2-2$^{nd}$ active vibration member and the passive vibration member.

According to some embodiments of the present disclosure, a corner portion of the first active vibration member can overlap the first periphery portion of each of the 2-1$^{st}$ active vibration member and the 2-2$^{nd}$ active vibration member.

According to some embodiments of the present disclosure, each of the 2-1$^{st}$ active vibration member and the 2-2$^{nd}$ active vibration member can be disposed to be inclined with respect to each of the first and second periphery portions of the first active vibration member.

According to some embodiments of the present disclosure, each of the 2-1$^{st}$ active vibration member and the 2-2$^{nd}$ active vibration member can comprise a first corner portion overlapping the first active vibration member, and a second corner portion connected to the connection portion, the connection portion can comprise a first connection member connected between the second corner portion of the 2-1$^{st}$ active vibration member and the passive vibration member, and a second connection member connected between the second corner portion of the 2-2$^{nd}$ active vibration member and the passive vibration member.

According to some embodiments of the present disclosure, the first vibration portion can comprise a first active vibration member including first to fourth periphery portions, and the second vibration portion can comprise a 2-1$^{st}$ active vibration member connected to the first periphery portion of the first active vibration member, a 2-2$^{nd}$ active vibration member connected to the second periphery portion of the first active vibration member in parallel with the 2-1$^{st}$ active vibration member with a center portion of the first active vibration member therebetween, a 2-3$^{rd}$ active vibration member connected to the third periphery portion of the first active vibration member, and a 2-4$^{th}$ active vibration member connected to the fourth periphery portion of the first active vibration member in parallel with the 2-3$^{rd}$ active vibration member with the center portion of the first active vibration member therebetween.

According to some embodiments of the present disclosure, a width of each of the 2-1$^{st}$ to 2-4$^{th}$ active vibration members can be smaller than a width of the first active vibration member.

According to some embodiments of the present disclosure, each of the 2-1$^{st}$ to 2-4$^{th}$ active vibration members can comprise a first periphery portion overlapping the first active vibration member, and a second periphery portion connected to the connection portion, the connection portion can comprise a first connection member connected between the second periphery portion of the 2-1$^{st}$ active vibration member and the passive vibration member, a second connection member connected between the second periphery portion of the 2-2$^{nd}$ active vibration member and the passive vibration member, a third connection member connected between the second periphery portion of the 2-3$^{rd}$ active vibration member and the passive vibration member, and a fourth connection member connected between the second periphery portion of the 2-4$^{th}$ active vibration member and the passive vibration member.

According to some embodiments of the present disclosure, a corner portion of the first active vibration member can overlap the first periphery portion of each of the 2-1$^{st}$ to 2-4$^{th}$ active vibration members.

According to some embodiments of the present disclosure, each of the 2-1$^{st}$ active vibration member and the 2-2$^{nd}$ active vibration member can be disposed to be inclined with respect to each of the first and second periphery portions of the first active vibration member, and each of the 2-3$^{rd}$ active vibration member and the 2-4$^{1}$ active vibration member can be disposed to be inclined with respect to each of the third and fourth periphery portions of the first active vibration member.

According to some embodiments of the present disclosure, each of the 2-1$^{st}$ to 2-4$^{th}$ active vibration members can comprise a first corner portion overlapping the first active vibration member, and a second corner portion connected to the connection portion, the connection portion can comprise a first connection member connected between the second corner portion of the 2-1$^{st}$ active vibration member and the passive vibration member, a second connection member connected between the second corner portion of the 2-2$^{nd}$ active vibration member and the passive vibration member, a third connection member connected between the second corner portion of the 2-3$^{rd}$ active vibration member and the passive vibration member, and a fourth connection member connected between the second corner portion of the 2-4$^{th}$ active vibration member and the passive vibration member.

An apparatus according to an embodiment of the present disclosure can comprise a passive vibration member, a plurality of vibration apparatuses connected to a rear surface of the passive vibration member, and a supporting member at the rear surface of the passive vibration member, each of the plurality of vibration apparatuses can comprise a first active vibration member, a 2-1$^{st}$ active vibration member and a 2-2$^{nd}$ active vibration member connected to a periphery of the first active vibration member in parallel with a center portion of the first active vibration member therebetween, and a connection portion connected to the rear surface of the passive vibration member and each of the 2-1$^{st}$ active vibration member and the 2-2$^{nd}$ active vibration member.

According to some embodiments of the present disclosure, the first active vibration member can comprise first and second periphery portions parallel with each other, and the first periphery portions of the 2-1$^{st}$ active vibration member and the 2-2$^{nd}$ active vibration member can be respectively connected to the first and second periphery portions of the first active vibration member.

According to some embodiments of the present disclosure, a corner portion of the first active vibration member can overlap the first periphery portion of each of the 2-1$^{st}$ active vibration member and the 2-2$^{nd}$ active vibration member.

According to some embodiments of the present disclosure, each of the 2-1$^{st}$ active vibration member and the 2-2$^{nd}$ active vibration member can be disposed to be inclined with respect to each of the first and second periphery portions of the first active vibration member.

According to some embodiments of the present disclosure, each of the plurality of vibration apparatuses can further comprise a 2-3$^{rd}$ active vibration member and a 2-4$^{th}$ active vibration member connected to a periphery of the first active vibration member in parallel with a center portion of the first active vibration member therebetween, the connection portion can be connected to the rear surface of the passive vibration member and each of the 2-1$^{st}$ to 2-4$^{t}$ active vibration members.

According to some embodiments of the present disclosure, the first active vibration member can comprise first and second periphery portions parallel with each other and third and fourth periphery portions parallel with each other, first periphery portions of the 2-1$^{st}$ active vibration member and the 2-2$^{nd}$ active vibration member can be respectively connected to the first and second periphery portions of the first active vibration member, and first periphery portions of the 2-3$^{rd}$ active vibration member and the 2-4$^{th}$ active vibration member can be respectively connected to the third and fourth periphery portions of the first active vibration member.

According to some embodiments of the present disclosure, a corner portion of the first active vibration member can overlap first periphery portion of each of the 2-1$^{st}$ active vibration member and the 2-2$^{nd}$ active vibration member.

According to some embodiments of the present disclosure, the first active vibration member can comprise first and second periphery portions parallel with each other and third and fourth periphery portions parallel with each other, each of the 2-1$^{st}$ active vibration member and the 2-2$^{nd}$ active vibration member can be disposed to be inclined with respect to each of the first and second periphery portions of the first active vibration member, and each of the 2-3$^{rd}$ active vibration member and the 2-4$^{th}$ active vibration member can be disposed to be inclined with respect to each of the third and fourth periphery portions of the first active vibration member.

According to some embodiments of the present disclosure, the plurality of vibration apparatuses can comprise a first group including one or more vibration apparatuses and a second group including one or more vibration apparatuses, and the number of vibration apparatuses of the first group can be equal to or different from the number of vibration apparatuses of the second group.

According to some embodiments of the present disclosure, a driving signal applied to the one or more vibration apparatuses of the first group can be the same as or different from a driving signal applied to the one or more vibration apparatuses of the second group.

According to some embodiments of the present disclosure, the active vibration member can comprise a vibration device including a piezoelectric material.

According to some embodiments of the present disclosure, each of the first active vibration member, the 2-1$^{st}$ active vibration member, and the 2-2$^{nd}$ active vibration member can comprise a vibration device including a piezoelectric layer, the piezoelectric layer can comprise a plurality of piezoelectric portions including a piezoelectric material, and a flexible portion between the plurality of piezoelectric portions.

According to some embodiments of the present disclosure, at least one or more of a plurality of piezoelectric portions configured at each of the 2-1$^{st}$ active vibration member and the 2-2$^{nd}$ active vibration member can overlap at least one or more of a plurality of piezoelectric portions configured at the first active vibration member.

According to some embodiments of the present disclosure, a driving signal applied to each of the 2-1$^{st}$ active vibration member and the 2-2$^{nd}$ active vibration member can have a phase which is the same as or opposite to a phase of a driving signal applied to the first active vibration member.

According to some embodiments of the present disclosure, a driving signal applied to the 2-1$^{st}$ active vibration member can be the same as or different from a driving signal applied to the 2-2$^{nd}$ active vibration member.

According to some embodiments of the present disclosure, a driving signal applied to each of the 2-1$^{st}$ active vibration member and the 2-2$^{nd}$ active vibration member can have a phase which is the same as or opposite to a phase of a driving signal applied to the first active vibration member.

According to some embodiments of the present disclosure, a driving signal applied to each of the 2-1$^{st}$ to 2-4$^{th}$ active vibration members can have a phase which is the same as or opposite to a phase of a driving signal applied to the first active vibration member.

According to some embodiments of the present disclosure, at least one or more of driving signals respectively applied to the 2-1$^{st}$ to 2-4$^{th}$, active vibration members can have at least one or more of different phases and different amplitudes.

According to some embodiments of the present disclosure, at least one or more of a phase and an amplitude of a driving signal applied to each of the 2-1$^{st}$ to 2-4$^{th}$ active vibration members can differ from at least one or more of a phase and an amplitude of a driving signal applied to the first active vibration member.

According to some embodiments of the present disclosure, the vibration apparatus can further comprise a mass member at the first active vibration member.

According to some embodiments of the present disclosure, the connection portion can comprise an elastic material.

According to some embodiments of the present disclosure, the passive vibration member can be a display panel including a display area having a plurality of pixels to implement an image, or can comprise one or more materials of wood, rubber, plastic, flexible glass, fiber, cloth, paper, metal, carbon, a mirror, and leather.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An apparatus, comprising:

a passive vibration member;

a vibration device coupled to a rear surface of the passive vibration member; and a supporting member at the rear surface of the passive vibration member, wherein the vibration device comprises:

a first vibration portion;

a second vibration portion coupled to a periphery of the first vibration portion; and a connection portion disposed between a periphery of the second vibration portion and the rear surface of the passive vibration member, wherein:

the first vibration portion comprises a first active vibration member including a first periphery portion and a second periphery portion;

the second vibration portion comprises a 2-1$^{st}$ active vibration member and a 2-2$^{nd}$ active vibration member respectively coupled to the first periphery portion of the first active vibration member and the second periphery portion of the first active vibration member; and the 2-1$^{st}$ active vibration member and the 2-2$^{nd}$ active vibration member are disposed at opposite sides of a center portion of the first active vibration member, wherein each of the 2-1$^{st}$ active vibration member and the 2-2$^{nd}$ active vibration member comprises:

a first periphery portion overlapping the first active vibration member of the first vibration portion; and a second periphery portion coupled to at least a portion of the connection portion, and wherein the connection portion comprises:

a first connection member coupled between the second periphery portion of the 2-1$^{st}$ active vibration member and the passive vibration member; and a second connection member coupled between the second periphery portion of the 2-2$^{nd}$ active vibration member and the passive vibration member.

2. The apparatus of claim 1, wherein a corner portion of the first active vibration member overlaps with at least one of the first periphery portion of the 2-1$^{st}$ active vibration member and the first periphery portion of the 2-2$^{nd}$ active vibration member.

3. The apparatus of claim 1, wherein each of the 2-1$^{st}$ active vibration member and the 2-2$^{nd}$ active vibration member is tilted with respect to the first active vibration member.

4. The apparatus of claim 1, wherein each of the 2-1$^{st}$ active vibration member and the 2-2$^{nd}$ active vibration member comprises:

a first corner portion overlapping with the first active vibration member; and a second corner portion coupled to a portion of the connection portion, and wherein the connection portion comprises:

a first connection member coupled between the second corner portion of the 2-1$^{st}$ active vibration member and the passive vibration member; and a second connection member coupled between the second corner portion of the 2-2$^{nd}$ active vibration member and the passive vibration member.

5. The apparatus of claim 1, wherein each of the first active vibration member, the 2-1$^{st}$ active vibration member, and the 2-2$^{nd}$ active vibration member includes a piezoelectric material.

6. The apparatus of claim 1, wherein:

each of the first active vibration member, the 2-1$^{st}$ active vibration member, and the 2-2$^{nd}$ active vibration member includes a piezoelectric layer, and the piezoelectric layer comprises:

a plurality of piezoelectric portions including a piezoelectric material; and a flexible portion between the plurality of piezoelectric portions.

7. The apparatus of claim 6, wherein at least one or more of the plurality of piezoelectric portions in each of the 2-1$^{st}$ active vibration member and the 2-2$^{nd}$ active vibration member overlap with at least one or more of the plurality of piezoelectric portions in the first active vibration member.

8. The apparatus of claim 1, wherein each of the 2-1$^{st}$ active vibration member and the 2-2$^{nd}$ active vibration member is configured to receive a driving signal having a phase which is same as or opposite to a phase of a driving signal applied to the first active vibration member.

9. The apparatus of claim 1, wherein the 2-1$^{st}$ active vibration member is configured to receive a driving signal that is same as or different from a driving signal applied to the 2-2$^{nd}$ active vibration member.

10. The apparatus of claim 9, wherein each of the 2-1$^{st}$ active vibration member and the 2-2$^{nd}$ active vibration member is configured to receive a driving signal that has a phase which is same as or opposite to a phase of a driving signal applied to the first active vibration member.

11. The apparatus of claim 1, wherein the vibration device further comprises a mass member at the first active vibration member.

12. The apparatus of claim 1, wherein:

the first active vibration member further includes a third periphery portion and a fourth periphery portion; and the second vibration portion further comprises:

a 2-3$^{rd}$ active vibration member coupled to the third periphery portion of the first active vibration member; and a 2-4$^{th}$ active vibration member coupled to the fourth periphery portion of the first active vibration member, and wherein the 2-3$^{rd}$ active vibration member and the 2-4$^{th}$ active vibration member are disposed at opposite sides of the first active vibration member.

13. The apparatus of claim 12, wherein a width of each of the 2-1$^{st}$ active vibration member, the 2-2$^{nd}$ active vibration member, the 2-3$^{rd}$ active vibration member and the 2-4$^{th}$ active vibration member is smaller than a width of the first active vibration member.

14. The apparatus of claim 12, wherein:

each of the 2-3$^{rd}$ active vibration member and the 2-4$^{th}$ active vibration member comprises:

a first periphery portion overlapping with a portion of the first active vibration member; and a second periphery portion coupled to a portion of the connection portion, and the connection portion further comprises:

a third connection member coupled between the second periphery portion of the 2-3$^{rd}$ active vibration member and the passive vibration member; and a fourth connection member coupled between the second periphery portion of the 2-4$^{th}$ active vibration member and the passive vibration member.

15. The apparatus of claim 12, wherein corner portions of the first active vibration member overlap with the 2-1$^{st}$ active vibration member, the 2-2$^{nd}$ active vibration member, the 2-3$^{rd}$ active vibration member and the 2-4$^{th}$ active vibration member.

16. The apparatus of claim 12, wherein:

each of the 2-1$^{st}$ active vibration member and the 2-2$^{nd}$ active vibration member is tilted with respect to each of the first and second periphery portions of the first active vibration member; and each of the 2-3$^{rd}$ active vibration member and the 2-4$^{th}$ active vibration member is tilted with respect to each of the third and fourth periphery portions of the first active vibration member.

17. The apparatus of claim 12, wherein:

each of the 2-1$^{st}$ to 2-4$^{th}$ active vibration members comprises:

a first corner portion overlapping with a portion of the first active vibration member; and a second corner portion coupled to the connection portion, and the connection portion comprises:

a first connection member coupled between the second corner portion of the 2-1$^{st}$ active vibration member and the passive vibration member;

a second connection member coupled between the second corner portion of the 2-2$^{nd}$ active vibration member and the passive vibration member;

a third connection member coupled between the second corner portion of the 2-3$^{rd}$ active vibration member and the passive vibration member; and a fourth connection member coupled between the second corner portion of the 2-4$^{th}$ active vibration member and the passive vibration member.

18. The apparatus of claim 12, wherein each of the 2-1$^{st}$ to 2-4$^{th}$ active vibration members is configured to receive a driving signal that has a phase which is same as or opposite to a phase of a driving signal applied to the first active vibration member.

19. The apparatus of claim 12, wherein at least two driving signals among driving signals respectively applied to the 2-1$^{st}$ to 2-4$^{th}$ active vibration members have different phases or different amplitudes.

20. The apparatus of claim 12, wherein at least one or more of a phase and an amplitude of a driving signal applied to at least one of the 2-1$^{st}$ to 2-4$^{th}$ active vibration members differs from at least one or more of a phase and an amplitude of a driving signal applied to the first active vibration member.

21. The apparatus of claim 1, wherein at least one of the first connection member and the second connection member comprises an elastic material.

22. The apparatus of claim 1, wherein the passive vibration member is a display panel including a display area having a plurality of pixels to implement an image, or comprises one or more materials of wood, rubber, plastic, flexible glass, fiber, cloth, paper, metal, carbon, a mirror, and leather.

23. An apparatus, comprising:

a passive vibration member;

a plurality of vibration devices coupled to a rear surface of the passive vibration member; and a supporting member at the rear surface of the passive vibration member, wherein each of the plurality of vibration devices comprises:

a first active vibration member;

a 2-1$^{st}$ active vibration member and a 2-2$^{nd}$ active vibration member coupled to a periphery of the first active vibration member with a center portion of the first active vibration member being between the 2-1$^{st}$ active vibration member and the 2-2$^{nd}$ active vibration member; and a connection portion coupled to the rear surface of the passive vibration member, the 2-1$^{st}$ active vibration member and the 2-2$^{nd}$ active vibration member.

24. The apparatus of claim 23, wherein:

the first active vibration member comprises a first periphery portion and a second periphery portion; and a first periphery portion of the 2-1$^{st}$ active vibration member and a first periphery portion of the 2-2$^{nd}$ active vibration member are respectively coupled to the first and second periphery portions of the first active vibration member.

25. The apparatus of claim 24, wherein corner portions of the first active vibration member overlap with the first periphery portion of each of the 2-1$^{st}$ active vibration member and the 2-2$^{nd}$ active vibration member.

26. The apparatus of claim 24, wherein the 2-1$^{st}$ active vibration member and the 2-2$^{nd}$ active vibration member are tilted with respect to the first and second periphery portions of the first active vibration member.

27. The apparatus of claim 23, wherein:

each of the plurality of vibration devices further comprises:

a 2-3$^{rd}$ active vibration member; and a 2-4$^{th}$ active vibration member; and at least a portion of the connection portion is coupled to the rear surface of the passive vibration member and each of the 2-1$^{st}$ to 2-4$^{th}$ active vibration members.

28. The apparatus of claim 27, wherein:

the first active vibration member comprises first and second periphery portions parallel with each other, and third and fourth periphery portions parallel with each other;

first periphery portions of the 2-1$^{st}$ active vibration member and the 2-2$^{nd}$ active vibration member are respectively coupled to the first and second periphery portions of the first active vibration member; and first periphery portions of the 2-3$^{rd}$ active vibration member and the 2-4$^{th}$ active vibration member are respectively coupled to the third and fourth periphery portions of the first active vibration member.

29. The apparatus of claim 28, wherein corner portions of the first active vibration member overlap with the first periphery portion of each of the 2-1$^{st}$ active vibration member and the 2-2$^{nd}$ active vibration member.

30. The apparatus of claim 27, wherein:

the first active vibration member comprises first and second periphery portions parallel with each other, and third and fourth periphery portions parallel with each other;

the 2-1$^{st}$ active vibration member and the 2-2$^{nd}$ active vibration member are tilted with respect to the first and second periphery portions of the first active vibration member; and the 2-3$^{rd}$ active vibration member and the 2-4$^{th}$ active vibration member are tilted with respect to the third and fourth periphery portions of the first active vibration member.

31. The apparatus of claim 27, wherein:

the plurality of vibration devices comprises a first group including one or more vibration devices and a second group including one or more vibration devices; and a number of vibration devices in the first group is equal to or different from a number of vibration devices in the second group.

32. The apparatus of claim 31, wherein the one or more vibration devices of the first group are configured to receive a driving signal that is same as or different from a driving signal applied to the one or more vibration devices in the second group.

* * * * *